United States Patent
Stark

(10) Patent No.: US 9,268,600 B2
(45) Date of Patent: Feb. 23, 2016

(54) PICOENGINE POOL TRANSACTIONAL MEMORY ARCHITECTURE

(71) Applicant: Gavin J. Stark, Cambridge (GB)

(72) Inventor: Gavin J. Stark, Cambridge (GB)

(73) Assignee: Netronome Systems, Inc., Santa Clara, CA (US)

( * ) Notice: Subject to any disclaimer, the term of this patent is extended or adjusted under 35 U.S.C. 154(b) by 151 days.

(21) Appl. No.: 13/970,601

(22) Filed: Aug. 20, 2013

(65) Prior Publication Data

US 2015/0058551 A1 Feb. 26, 2015

(51) Int. Cl.
*G06F 9/46* (2006.01)
*G06F 15/163* (2006.01)

(52) U.S. Cl.
CPC .............. *G06F 9/467* (2013.01); *G06F 15/163* (2013.01)

(58) Field of Classification Search
None
See application file for complete search history.

(56) References Cited

U.S. PATENT DOCUMENTS

| | | | |
|---|---|---|---|
| 2009/0172292 A1* | 7/2009 | Saha et al. | 711/135 |
| 2010/0195654 A1* | 8/2010 | Jacobson et al. | 370/392 |
| 2014/0281353 A1* | 9/2014 | Bybell et al. | 711/206 |

* cited by examiner

*Primary Examiner* — Jared Rutz
*Assistant Examiner* — Christopher Do
(74) *Attorney, Agent, or Firm* — Imperium Patent Works LLP; T. Lester Wallace; Mark D. Marrello

(57) ABSTRACT

A transactional memory (TM) includes a selectable bank of hardware algorithm prework engines, a selectable bank of hardware lookup engines, and a memory unit. The memory unit stores result values (RVs), instructions, and lookup data operands. The transactional memory receives a lookup command across a bus from one of a plurality of processors. The lookup command includes a source identification value, data, a table number value, and a table set value. In response to the lookup command, the transactional memory selects one hardware algorithm prework engine and one hardware lookup engine to perform the lookup operation. The selected hardware algorithm prework engine modifies data included in the lookup command. The selected hardware lookup engine performs a lookup operation using the modified data and lookup operands provided by the memory unit. In response to performing the lookup operation, the transactional memory returns a result value and optionally an instruction.

13 Claims, 21 Drawing Sheets

COMMAND-PUSH-PULL (CPP) DATA BUS
STRUCTURE

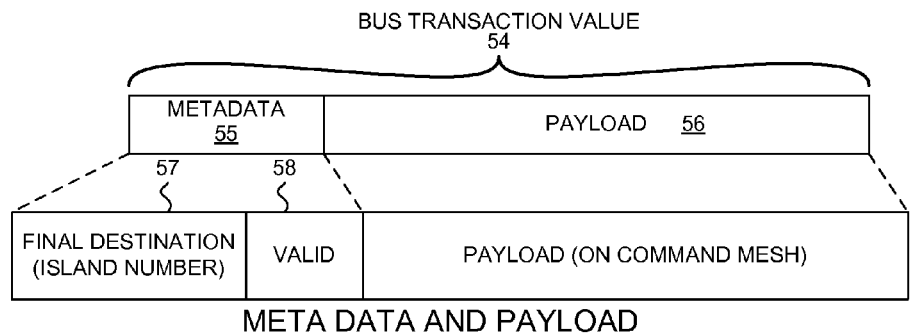

META DATA AND PAYLOAD

FIG. 3

| FIELD | WIDTH | DESCRIPTION |
|---|---|---|
| TARGET | 4 | CPP TARGET FOR THE COMMAND. |
| ACTION | 5 | ACTION RECOGNIZED BY THE CPP TARGET INDICATING WHAT SHOULD BE PERFORMED. |
| TOKEN | 2 | SUBTYPE OF ACTION RECOGNIZED BY THE CPP TARGET, INDICATING THE FLAVOR OF THE COMMAND. |
| LENGTH | 5 | LENGTH OF THE COMMAND, DEPENDENT ON THE ACTION/ TOKEN, INTERPRETED BY THE CPP TARGET. |
| ADDRESS | 40 | ADDRESS THAT THE COMMAND SHOULD OPERATE ON. |
| BYTE_MASK | 8 | FURTHER OPTIONS OF A COMMAND (A BYTE MASK). |
| DATA_MASTER_ISLAND | 6 | ISLAND OF DATA MASTER. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM. |
| SIGNAL_MASTER | 10 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED FOR THE COMMAND. |
| SIGNAL_REF | 7 | REFERENCE WITHIN THE SIGNAL MASTER AS TO WHEN SIGNAL SHOULD BE INDICATED WITH THE COMMANDS PULL OR PUSH. |

COMMAND PAYLOAD

FIG. 4

| FIELD | WIDTH | DESCRIPTION |
|---|---|---|
| TARGET_ISLAND | 6 | ISLAND TO RETURN PULL DATA TO. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE; RETURNED WITH PULL DATA. |
| DATA_MASTER | 4 | MASTER WITHIN THE ISLAND. |
| DATA_REF | 14 | PUSH-PULL ID REFERENCE INDICATING TO THE DATA MASTER WHERE TO PUSH/PULL FROM; NORMALLY COPIED FROM THE INVOKING COMMAND. |
| SIGNAL_MASTER | 8 | EXTENSION FOR DATA_REF AS A DATA MASTER ONLY; FOR OTHER MASTERS INDICATING WHICH MASTER WITHIN THE DATA MASTER'S ISLAND SHOULD BE SIGNALED WHEN THE LAST DATA IS PULLED. |
| SIGNAL_REF | 7 | REFERENCE USABLE BY THE MASTER TO DETERMINE WHICH SIGNAL SHOULD BE INDICATED WITH THE LAST PULL DATA. |
| LENGTH | 5 | NUMBER OF 64-BIT DATA WORDS TO PULL FROM THE DATA MASTER, STARTING AT THE SPECIFIED DATA_REF. |

PULL-ID PAYLOAD

FIG. 5

| FIELD | WIDTH | DESCRIPTION |
|---|---|---|
| DATA_IS_PULL | 1 | ASSERTED FOR PULL DATA. |
| DATA_MASTER_OR_TARGET_PORT | 4 | DATA MASTER FOR PUSH DATA OR TARGET PORT FOR PULL DATA. |
| DATA_OR_TARGET_REF | 14 | DATA REF FOR PUSH DATA OR TARGET REF FOR PULL DATA. |
| SIGNAL_MASTER | 8 | ONLY USED FOR PUSH DATA; MASTER IN ISLAND TO SIGNAL IF DATA_MASTER IS NOT CTM; EXTENSION OF DATA_REF FOR DATA_MASTER OF CTM. |
| SIGNAL_REF_OR_CYCLE | 7 | SIGNAL_REF FOR PUSH DATA OR CYCLE FOR PULL DATA. |
| LAST | 1 | ASSERTED WITH THE LAST WORD OF DATA FOR PULL OR PUSH DATA. |
| DATA | 64 | 64-BITS OF PULL/PUSH DATA. |
| DATA_ERROR | 2 | ONE BIT PER 32-BITS OF DATA TO INDICATE AN UNCORRECTABLE ERROR. |
| DATA_VALID | 2 | ONE BIT PER 32-BITS OF DATA TO INDICATE, ON PUSH, THAT THE DATA IS TO BE WRITTEN TO THE DATA_MASTER. |
| NO_SPLIT | 1 | FOR PUSH DATA ONLY, ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD

FIG. 6

| FIELD | WIDTH | DESCRIPTION |
|---|---|---|
| DATA_IS_PULL | 1 | ASSERTED FOR PULL DATA. |
| TARGET_PORT | 2 | IDENTIFIES THE SUB-CIRCUIT IN THE FINAL DESTINATION ISLAND THAT IS THE TARGET (OF A MULTI-TARGET ISLAND). |
| TARGET_REF | 14 | TARGET SPECIFIC REFERENCE, RETURNED WITH PULL DATA. |
| CYCLE-OF_PULL | 7 | CYCLE OF PULL DATA. |
| LAST | 1 | ASSERTED WITH THE LAST WORD OF PULL DATA. |
| DATA | 64 | 64-BITS OF PULLED DATA FROM THE DATA MASTER. |
| DATA_ERROR | 2 | ONE BIT PER 32-BITS OF PULLED DATA TO INDICATE AN UNCORRECTABLE ERROR FROM THE DATA_MASTER DATA SOURCE. |

DATA PAYLOAD (FOR A PULL)

FIG. 7

| FIELD | WIDTH | DESCRIPTION |
|---|---|---|
| DATA_IS_PULL | 1 | DEASSERTED FOR PUSH DATA. |
| DATA_MASTER | 4 | PUSH ID WITHIN THE ISLAND OF DATA MASTER THE DATA IS DESTINED FOR. |
| DATA_REF | 14 | REFERENCE WITHIN DATA MASTER AS TO WHERE TO PUSH FROM. |
| SIGNAL_MASTER | 8 | FOR CTM AS A DATA MASTER ONLY THIS IS AN EXTENSION FOR DATA_REF; FOR OTHER MASTERS INDICATING WHICH MASTER WITHIN THE DATA MASTER'S ISLAND SHOULD BE SIGNALED WHEN THE LAST DATA IS PUSHED. |
| SIGNAL_REF | 7 | REFERENCE WITHIN THE SIGNAL MASTER AS TO WHICH SIGNAL SHOULD BE INDICATED WITH THE LAST PUSH DATA. |
| LAST | 1 | ASSERTED WITH THE LAST WORD OF PUSH DATA. |
| DATA | 64 | 64-BITS OF PUSH DATA FROM THE DATA MASTER. |
| DATA_ERROR | 2 | ONE BIT PER 32-BITS OF PUSHED DATA TO INDICATE AN UNCORRECTABLE ERROR FROM THE DATA_MASTER DATA SOURCE. |
| DATA_VALID | 2 | ONE BIT PER 32-BITS OF DATA TO INDICATE THAT THE DATA IS TO BE WRITTEN TO THE DATA_MASTER. |
| NO_SPLIT | 1 | ASSERTED FOR SIGNALING TO INDICATE THAT BOTH SIGNAL_REF AND SIGNAL_REF1 ARE TO BE INDICATED TO THE SIGNALED MASTER. |

DATA PAYLOAD (FOR A PUSH)

FIG. 8

ME ISLAND

MU ISLAND

ROUTER

PICO ENGINE POOL

PICO ENGINE LOOKUP MEMORY

PICO ENGINE SHARED MEMORY

| SIZE [3] | SIZE [2] | SIZE [1] | SIZE [0] | D15 | D14 | D13 | D12 | D11 | D10 | D9 | D8 | D7 | D6 | D5 | D4 | D3 | D2 | D1 | D0 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 1 | 0 | 0 | 0 | 0 | 0 | 0 | 0 | 0 | 0 | 0 | 0 | 0 | 0 | 0 | 0 | 1 |
| 0 | 0 | 1 | 0 | 0 | 0 | 0 | 0 | 0 | 0 | 0 | 0 | 0 | 0 | 0 | 0 | 0 | 0 | 1 | 1 |
| 0 | 0 | 1 | 1 | 0 | 0 | 0 | 0 | 0 | 0 | 0 | 0 | 0 | 0 | 0 | 0 | 0 | 1 | 1 | 1 |
| 0 | 1 | 0 | 0 | 0 | 0 | 0 | 0 | 0 | 0 | 0 | 0 | 0 | 0 | 0 | 0 | 1 | 1 | 1 | 1 |
| 0 | 1 | 0 | 1 | 0 | 0 | 0 | 0 | 0 | 0 | 0 | 0 | 0 | 0 | 0 | 1 | 1 | 1 | 1 | 1 |
| 0 | 1 | 1 | 0 | 0 | 0 | 0 | 0 | 0 | 0 | 0 | 0 | 0 | 0 | 1 | 1 | 1 | 1 | 1 | 1 |
| 0 | 1 | 1 | 1 | 0 | 0 | 0 | 0 | 0 | 0 | 0 | 0 | 0 | 1 | 1 | 1 | 1 | 1 | 1 | 1 |
| 1 | 0 | 0 | 0 | 0 | 0 | 0 | 0 | 0 | 0 | 0 | 0 | 1 | 1 | 1 | 1 | 1 | 1 | 1 | 1 |
| 1 | 0 | 0 | 1 | 0 | 0 | 0 | 0 | 0 | 0 | 0 | 1 | 1 | 1 | 1 | 1 | 1 | 1 | 1 | 1 |
| 1 | 0 | 1 | 0 | 0 | 0 | 0 | 0 | 0 | 0 | 1 | 1 | 1 | 1 | 1 | 1 | 1 | 1 | 1 | 1 |
| 1 | 0 | 1 | 1 | 0 | 0 | 0 | 0 | 0 | 1 | 1 | 1 | 1 | 1 | 1 | 1 | 1 | 1 | 1 | 1 |
| 1 | 1 | 0 | 0 | 0 | 0 | 0 | 0 | 1 | 1 | 1 | 1 | 1 | 1 | 1 | 1 | 1 | 1 | 1 | 1 |
| 1 | 1 | 0 | 1 | 0 | 0 | 0 | 1 | 1 | 1 | 1 | 1 | 1 | 1 | 1 | 1 | 1 | 1 | 1 | 1 |
| 1 | 1 | 1 | 0 | 0 | 0 | 1 | 1 | 1 | 1 | 1 | 1 | 1 | 1 | 1 | 1 | 1 | 1 | 1 | 1 |
| 1 | 1 | 1 | 1 | 0 | 1 | 1 | 1 | 1 | 1 | 1 | 1 | 1 | 1 | 1 | 1 | 1 | 1 | 1 | 1 |

*DEMULTIPLEXER PERFORMS A DECODE AND MASK OPERATION.

DEMULTIPLEXER TABLE

FIG. 17

| BIT WIDTH | FIELD NAME | DESCRIPTION |
|---|---|---|
| 1 | DATA_RETRY | INDICATES AN ECC ERROR EVENT; TRIGGERS PE REQUEST RETRY. |
| 1 | DATA_VALID | INDICATES IF THE DATA FIELDS ARE VALID. |
| 32 | DATA_DATA | RESULT DATA. |
| 6 | DATA_SOURCE | INDICATES SOURCE OF THE DATA LOOKUP (ORIGINATING PE). |
| 1 | DATA_NF | INDICATES IF LOOKUP DATA NOT FOUND (ONLY FOR CAM OPERATIONS) |
| 25 | XXX | ADDITIONAL INFORMATION |

RESULT VALUE CONTENTS

FIG. 19

| BIT WIDTH | FIELD NAME | DESCRIPTION |
|---|---|---|
| 1 | VALID | INDICATES IF THE DATA FIELDS ARE VALID. |
| 4 | TABLE_NUMBER | INDICATES WHICH TABLE TO BE USED. |
| 1 | TABLE_SET | INDICATES WHICH TABLE TO BE USED. |
| 64 | TABLE_DATA | THE DATA RECEIVED BY SELECTOR. |
| 1 | INST_FETCH | SET FOR INSTRUCTION FETCH (RESULT OUTPUT ON INSTRUCTION PATH). |
| 1 | FETCH_MORE | ADDITIONAL INSTRUCTION INFORMATION. (OPTIONAL) |
| 1 | FETCH_256 | ADDITIONAL INSTRUCTION INFORMATION (OPTIONAL). |
| 6 | SOURCE | INDICATES THE ORIGINATING PICO ENGINE NUMBER. |
| 2 | TAG | INDICATES OTHER PICO ENGINES TO RECEIVE RESULT. (OPTIONAL) |

LOOKUP COMMAND CONTENTS

FIG. 20

| BIT WIDTH | FIELD NAME | DESCRIPTION |
|---|---|---|
| 1 | GRANT_BIT | INDICATES THAT THE LOOKUP COMMAND HAS BEEN RECEIVED. |
| 1 | INST_VALID | INDICATES THAT THE REST OF THE INSTRUCTION DATA IS VALID. |
| 128 | INST_DATA | INSTRUCTION OPCODE DATA. |
| 16 | INST_ADDRESS | INDICATES WHERE INSTRUCTION IS TO BE SENT. |
| 6 | INST_SOURCE | INDICATES PICO ENGINE THAT ISSUED THE INSTRUCTION. |

INSTRUCTION CONTENTS

FIG. 21

| BITS | BIT WIDTH | FIELD NAME | DESCRIPTION |
|---|---|---|---|
| 125:108 | 18 | RESULT 2 | RESULT VALUE RETURNED IF SELECTED DATA EQUALS DATA 2 |
| 107:90 | 18 | RESULT 1 | RESULT VALUE RETURNED IF SELECTED DATA EQUALS DATA 1 |
| 89:72 | 18 | RESULT 0 | RESULT VALUE RETURNED IF SELECTED DATA EQUALS DATA 0 |
| 71:48 | 24 | DATA 2 | DATA TO COMPARE RECEIVED DATA TO FOR RESULT 2 |
| 14:24 | 24 | DATA 1 | DATA TO COMPARE RECEIVED DATA TO FOR RESULT 1 |
| 23:0 | 24 | DATA 0 | DATA TO COMPARE RECEIVED DATA TO FOR RESULT 0 |

CAMR24 LOOKUP DATA OPERANDS

FIG. 22

| BITS | BIT WIDTH | FIELD NAME | DESCRIPTION |
|---|---|---|---|
| 127:112 | 16 | DATA 7 | RESULT IS 14 IF RECEIVED DATA EQUALS DATA 7. |
| 111:96 | 16 | DATA 6 | RESULT IS 12 IF RECEIVED DATA EQUALS DATA 6. |
| 95:80 | 16 | DATA 5 | RESULT IS 10 IF RECEIVED DATA EQUALS DATA 5. |
| 79:64 | 16 | DATA 4 | RESULT IS 8 IF RECEIVED DATA EQUALS DATA 4. |
| 63:48 | 16 | DATA 3 | RESULT IS 6 IF RECEIVED DATA EQUALS DATA 3. |
| 47:32 | 16 | DATA 2 | RESULT IS 4 IF RECEIVED DATA EQUALS DATA 2. |
| 31:16 | 16 | DATA 1 | RESULT IS 2 IF RECEIVED DATA EQUALS DATA 1. |
| 15:0 | 16 | DATA 0 | RESULT IS 0 IF RECEIVED DATA EQUALS DATA 0. |

CAM16 LOOKUP DATA OPERANDS

FIG. 23

| BITS | BIT WIDTH | FIELD NAME | DESCRIPTION |
|---|---|---|---|
| 127:96 | 32 | DATA 3 | RESULT IF OFFSET TO DATA WORD IS 3. |
| 95:64 | 32 | DATA 2 | RESULT IF OFFSET TO DATA WORD IS 2. |
| 63:32 | 32 | DATA 1 | RESULT IF OFFSET TO DATA WORD IS 1. |
| 31:0 | 32 | DATA 0 | RESULT IF OFFSET TO DATA WORD IS 0. |

LUT32 LOOKUP DATA OPERANDS

FIG. 24

HARDWARE PREFIX REDUCTION CIRCUIT

| INPUT<br>A[0-3] | OUTPUT<br>R[0-3] |
|---|---|
| 0XXX | 0000 |
| 100X | 0001 |
| 101X | 0010 |
| 11XX | 0011 |

INPUT IS 4 BITS OF PREFIX DATA.
REDUCES PREFIX DATA OF SIZE N BITS TO
PREFIX REPRESENTATION DATA OF SIZE M
BITS WHERE M<N.

PREFIX REDUCTION ALGORITHM

FIG. 28

| PREFIX TYPE | REQUIRED MEMORY SIZE |
|---|---|
| STANDARD PREFIX | $2^n * n$ |
| PREFIX REDUCTION | $(2^n - 1)*2$ |
| REQUIRED MEMORY RATIO: | $\dfrac{(2^n - 1) * 2}{2^n * n} \longrightarrow 2/n$ |

WHERE $n$ IS THE BIT WIDTH OF THE PREFIX DATA.

PREFIX MEMORY SAVINGS

FIG. 29

PICOENGINE POOL TRANSACTIONAL MEMORY ARCHITECTURE

TECHNICAL FIELD

The described embodiments relate generally to network processor integrated circuits employing transactional memories and to related methods.

BACKGROUND INFORMATION

A network processor is a device that executes programs to handle packet traffic in a data network. A network processor is also often referred to as a network flow processor or simply a flow processor. Examples include network processor integrated circuits on router line cards and in other network equipment. In one example, a network processor integrated circuit is capable of receiving packets, classifying and performing atomic operations on the packets and associated packet data, and transmitting packets. Processors on the integrated circuit are called upon to perform processing functions that include using lookup tables stored in on-chip memories to find data structures that store information pertaining to different types of packets. A processor on the integrated circuit may also be called upon to determine and to log updated packet count and byte count information into appropriate tables in memory. As throughput requirements increase, ways of adding processing power are sought.

In one specific example, a network processor integrated circuit uses the flexible and expandable IXP2800 architecture. The IXP2800 architecture allows multiple high-speed processors (referred to as microengines) to access the same memory resources via a common command/push/pull bus. Due to use of the IXP2800 architecture and multiple microengines, increased processing power is brought to bear on the tasks of identifying data structures using lookup algorithms. If more throughput is required, then more microengines can be employed. If less throughput is required, then fewer microengines can be employed. The NFP-3XXX and NFP-6XXX families of network processor integrated circuits available from Systems, Inc. of Santa Clara, Calif. include a selection of IXP2800-based network processor integrated circuits having different numbers of microengines.

SUMMARY

An Island-Based Network Flow Processor (IB-NFP) includes a plurality of islands that are interconnected by a configurable mesh Command/Push/Pull (CPP) data bus. A first of the islands includes a processor. A second of the islands includes a novel transactional memory. The CPP data bus includes a configurable command mesh, a configurable pull-id mesh, a configurable data0 mesh, and a configurable data1 mesh.

In a first novel aspect, a processor on an island sends a lookup command across a bus to the novel transactional memory of the island. The lookup command includes a source identification value, lookup data, an index value, a table set value, and a table number value. A memory unit of the transactional memory stores a plurality of result values and a plurality of instruction in a corresponding set of memory locations. The transactional memory includes a selectable bank of hardware algorithm prework engines and a selectable bank of hardware lookup engines. One of the hardware algorithm prework engines modifies the lookup data and provides the modified lookup data to one hardware lookup engine. The hardware lookup engine also receives lookup data operands from the memory unit and performs a lookup operation and returns a result value to the processor. The transactional memory also returns an instruction in response to receiving the lookup command. To carry out the lookup operation, there is only one bus transaction value sent across the bus.

In one specific example, the selectable bank of hardware algorithm prework engines includes a decoder circuit, an encoder circuit, a multiplexer circuit, and a barrel shifter. The selectable bank of hardware lookup engines include a direct hardware lookup engine, a multi-bit trie hardware lookup, a Content Addressable Memory (CAM) hardware lookup engine, a Content Addressable Memory with Result (CAMR) hardware lookup engine, a Ternary Content Addressable Memory (TCAM) hardware lookup engine, a Ternary Content Addressable Memory with Result (TCAMR) hardware lookup engine, a Lookup Table (LUT) hardware lookup engine, and a hardware prefix reduction circuit.

In a second novel aspect, a transactional memory includes a hardware prefix reduction circuit. The hardware prefix reduction circuit includes a plurality of levels, each level including an input conductor, an output conductor, and a plurality of nodes. Each node including a storage device and a buffer. The storage device is coupled to the buffer. The storage device stores a digital logic level and the buffer couples the digital logic level to the output conductor.

In one example, the input conductor is coupled to the buffer. When a digital logic low signal is present on the input conductor, the buffer couples the digital logic level stored in the storage device to the output conductor. When a digital logic high signal is present on the input conductor, the buffer does not couple the digital logic level to the output conductor.

In a second example, the node further includes an inverter. The input conductor is coupled to an input terminal of the inverter and an output terminal of the inverter is coupled to the buffer. When a digital logic low signal is present on the input conductor, a digital logic high signal is present on the inverter output terminal and the buffer couples the digital logic level stored in the storage device to the output conductor. When a digital logic high signal is present on the input conductor, a digital logic low signal is present on the inverter output terminal and the buffer does not couple the digital logic level to the output conductor.

In a third example, the node further includes an AND gate. The AND gate includes two non-inverting inputs. The input conductor is coupled to a first non-inverting input of the AND gate. A digital logic signal from another node in a preceding level is coupled to a second non-inverting input of the AND gate. An output terminal of the AND gate is coupled to the buffer. When a digital logic low signal is present on the output terminal of the AND gate, the buffer couples the digital logic level stored in the storage device is coupled to the output conductor. When a digital logic high signal is present on the output terminal of the AND gate, the buffer does not couple the digital logic level stored in the storage device is not coupled to the output conductor.

In a fourth example, the node further includes an AND gate. The AND gate includes a first inverting input and a second non-inverting input. The input conductor is coupled to the first inverting input of the AND gate. A digital logic signal from another node in a preceding level is coupled to the second non-inverting input of the AND gate. An output terminal of the AND gate is coupled to the buffer. When a digital logic low signal is present on the output terminal of the AND gate, the buffer couples the digital logic level stored in the storage device is coupled to the output conductor. When a digital logic high signal is present on the output terminal of the AND gate, the buffer does not couple the digital logic level stored in the storage device is not coupled to the output conductor.

In a fifth example, the storage device is a register and the buffer is a tri-state buffer. Each level includes twice as many nodes as are included in the preceding level of the hardware prefix reduction circuit. The storage device included in each node is individually programmable. Only one digital logic level is output to each output conductor at a given moment in time.

In a fifth example, the hardware prefix reduction circuit includes four levels and thirty nodes (two nodes are included in the first level, four nodes are included in the second level, eight nodes are included in the third level, and sixteen nodes are included in the fourth level).

In a sixth example, the hardware prefix reduction circuit includes six levels and one hundred and twenty six nodes (two nodes are included in the first level, four nodes are included in the second level, eight nodes are included in the third level, sixteen nodes are included in the fourth level, thirty two nodes are included in the fifth level, and sixty four nodes are included in the sixth level).

In a seventh example, the hardware prefix reduction circuit includes at least four levels. A first bit of an IP address is communicated on the input conductor included in the first level. A second bit of the IP address is communicated on the input conductor included in the second level. A third bit of the IP address is communicated on the input conductor included in the third level. A fourth bit of the IP address is communicated on the input conduct included in the fourth level.

In a third novel aspect, there is only one local transactional memory (local lookup memory) assigned to each group of processors. Each group of processors includes four processors. There is at least one shared transactional memory (shared lookup memory) assigned to two or more groups of processors. Each processor lookup command includes an identifier indicating the target transactional memory. The local transactional memory (local lookup memory) includes 16 kB of storage space. The shared transactional memory (shared lookup memory) includes 64 kB of storage space. While the local transactional memory (local lookup memory) has less storage space, it has faster access time serves result values and instructions to fewer processors. The number of processors included in a group, the number of levels and nodes included in a hardware prefix reduction circuit, the number of engines included in the selectable bank of algorithm prework engines, and the number of engines included in the selectable bank of hardware lookup engines may vary depending on the desired application.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 is diagram of a bus transaction value communicated across the CPP data bus.

FIG. 4 is a table listing the parts of the command payload of the bus transaction value of FIG. 3, when the bus transaction value is a command sent across the command mesh of the CPP data bus.

FIG. 5 is a table listing the width and description of each field within the payload of a bus transaction value sent across the pull-id mesh of the CPP data bus.

FIG. 6 is a table listing the width and description of each field within the payload of a bus transaction value sent across the data0 or data1 mesh of the CPP data bus.

FIG. 7 is a table listing the width and description of each field within the data payload of a pull transaction.

FIG. 8 is a table listing the width and description of each field within the data payload of a push transaction.

FIG. 17 is a demultiplexing table describing the operation of address table 253.

FIG. 19 is a table describing the contents of a result value.

FIG. 20 is a table describing the contents of a lookup command.

FIG. 21 is a table describing the contents of an instruction.

FIG. 22 is a table describing the contents of lookup data operands for a twenty four bit Content Addressable Memory with Result (CAMR24) lookup.

FIG. 23 is a table describing the contents of lookup data operands for a sixteen bit Content Addressable Memory (CAM16) lookup.

FIG. 24 is a table describing the contents of lookup data operands for a thirty two bit Lookup Table (LUT32) lookup.

FIG. 28 is a table describing a bit reduction algorithm performed by the hardware prefix reduction circuit.

FIG. 29 is a table describing the memory savings achieved by utilization of the hardware prefix reduction circuit.

DETAILED DESCRIPTION

Reference will now be made in detail to background examples and some embodiments of the invention, examples of which are illustrated in the accompanying drawings. In the description and claims below, relational terms such as "top", "down", "upper", "lower", "top", "bottom", "left" and "right" may be used to describe relative orientations between different parts of a structure being described, and it is to be understood that the overall structure being described can actually be oriented in any way in three-dimensional space.

Figure 1:
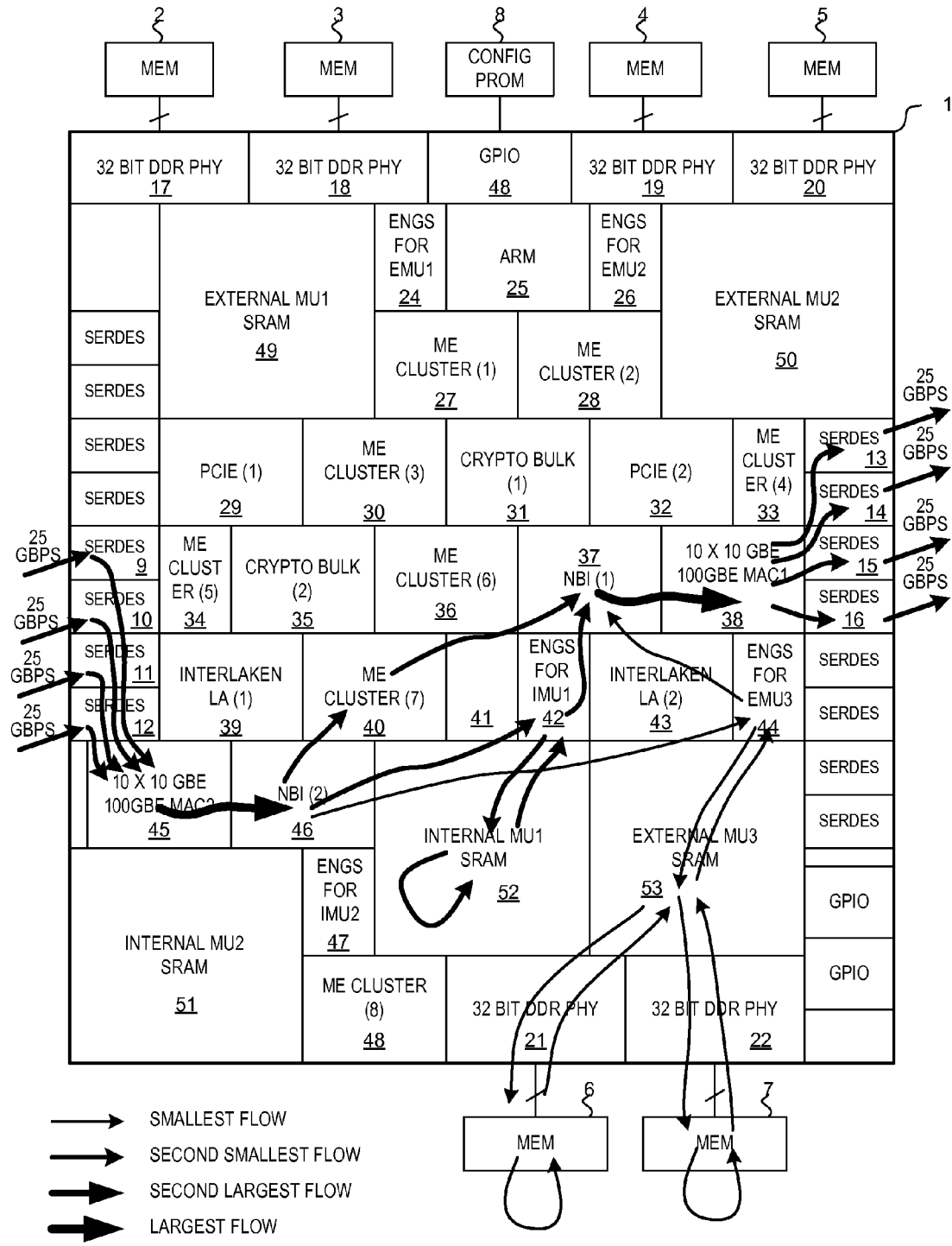
FIG. 1 is a top-down diagram of an Island-Based Network Flow Processor (IB-NFP) integrated circuit 1 and associated memory circuits 2-7 in an MPLS router application.

FIG. 1 is a top-down diagram of an Island-Based Network Flow Processor (IB-NFP) integrated circuit 1 and associated memory circuits 2-7 in an MPLS router application. IB-NFP integrated circuit 1 includes many I/O (input/output) terminals (not shown). Each of these terminals couples to an associated terminal of the integrated circuit package (not shown) that houses the IB-NFP integrated circuit. The integrated circuit terminals may be flip-chip microbumps and are not illustrated. Alternatively, the integrated circuit terminals may be wire bond pads.

SerDes circuits 9-12 are the first set of four SerDes circuits that are used to communicate with an external network via optical cables. SerDes circuits 13-16 are the second set of four SerDes circuits that are used to communicate with a switch fabric (not shown) of the router. Each of these SerDes circuits 13-16 is duplex in that it has a SerDes connection for receiving information and it also has a SerDes connection for transmitting information. Each of these SerDes circuits can communicate packet data in both directions simultaneously at a sustained rate of 25 Gbps. IB-NFP integrated circuit 1 accesses external memory integrated circuits 2-7 via corresponding 32-bit DDR physical interfaces 17-22, respectively. IB-NFP integrated circuit 1 also has several general purpose input/output (GPIO) interfaces. One of these GPIO interfaces 23 is used to access external PROM 8.

In addition to the area of the input/output circuits outlined above, the IB-NFP integrated circuit 1 also includes two additional areas. The first additional area is a tiling area of islands 24-48. Each of the islands is either of a full rectangular shape, or is half the size of the full rectangular shape. For example, the island 29 labeled "PCIE (1)" is a full island. The island 34 below it labeled "ME CLUSTER (5)" is a half island. The functional circuits in the various islands of the tiling area are interconnected by: 1) a configurable mesh Command/Push/Pull (CPP) data bus, 2) a configurable mesh control bus, and 3) a configurable mesh event bus. Each such mesh bus extends over the two-dimensional space of islands with a regular grid or "mesh" pattern.

In addition to this tiling area of islands 24-48, there is a second additional area of larger sized blocks 49-53. The functional circuitry of each of these blocks is not laid out to consist of islands and half-islands in the way that the circuitry of islands 24-48 is laid out. The mesh bus structures do not extend into or over any of these larger blocks. The mesh bus structures do not extend outside of island 24-48. The functional circuitry of a larger sized block may connect by direct dedicated connections to an interface island and through the interface island achieve connectivity to the mesh buses and other islands.

The arrows in FIG. 1 illustrate an operational example of IB-NFP integrated circuit 1 within the MPLS router. 100 Gbps packet traffic is received onto the router via an optical cable (not shown), flows through an optics transceiver (not shown), flows through a PHY integrated circuit (not shown), and is received onto IB-NFP integrated circuit 1, is spread across the four SerDes I/O blocks 9-12. Twelve virtual input ports are provided at this interface. The symbols pass through direct dedicated conductors from the SerDes blocks 9-12 to ingress MAC island 45. Ingress MAC island 45 converts successive symbols delivered by the physical coding layer into packets by mapping symbols to octets, by performing packet framing, and then by buffering the resulting packets for subsequent communication to other processing circuitry. The packets are communicated from MAC island 45 across a private inter-island bus to ingress NBI (Network Bus Interface) island 46. In addition to the optical cable that supplies packet traffic into the IB-NFP integrated circuit from the router, there is another optical cable that communicates packet traffic in the other direction out of the IB-NFP integrated circuit and to the router.

For each packet received onto the IB-BPF in the example of FIG. 1, the functional circuitry of ingress NBI island 46 examines fields in the header portion to determine what storage strategy to use to place the packet into memory. In one example, NBI island 46 examines the header portion and from that determines whether the packet is an exception packet or whether the packet is a fast-path packet. If the packet is an exception packet then the NBI island determines a first storage strategy to be used to store the packet so that relatively involved exception processing can be performed efficiently, whereas if the packet is a fast-path packet then the NBI island determines a second storage strategy to be used to store the packet for more efficient transmission of the packet from the IB-NFP. NBI island 46 examines a packet header, performs packet preclassification, determines that the packet is a fast-path packet, and determines that the header portion of the packet should be placed into a CTM (Cluster Target Memory) in ME (Microengine) island 40. The header portion of the packet is therefore communicated across the configurable mesh data bus from NBI island 46 to ME island 40. The CTM is tightly coupled to microengines in the ME island 40. The ME island 40 determines header modification and queuing strategy for the packet based on the packet flow (derived from packet header and contents) and the ME island 40 informs a second NBI island 37 of these. The payload portions of fast-path packets are placed into internal SRAM (Static Random Access Memory) MU block 52 and the payload portions of exception packets are placed into external DRAM 6 and 7.

Half island 42 is an interface island through which all information passing into, and out of, SRAM MU block 52 passes. The functional circuitry within half island 42 serves as the interface and control circuitry for the SRAM within block 52. For simplicity purposes in the discussion below, both half island 42 and MU block 52 may be referred to together as the MU island, although it is to be understood that MU block 52 is actually not an island as the term is used here but rather is a block. The payload portion of the incoming fast-path packet is communicated from NBI island 46, across the configurable mesh data bus to SRAM control island 42, and from control island 42, to the interface circuitry in block 52, and to the internal SRAM circuitry of block 52. The internal SRAM of block 52 stores the payloads so that they can be accessed for flow determination by the ME island.

In addition, a preclassifier in the ingress NBI island 46 determines that the payload portions for others of the packets should be stored in external DRAM 6 and 7. For example, the payload portions for exception packets are stored in external DRAM 6 and 7. Interface island 44, external MU SRAM block 53, and DDR PHY I/O blocks 21 and 22 serve as the interface and control for external DRAM integrated circuits 6 and 7. The payload portions of the exception packets are therefore communicated across the configurable mesh data bus from NBI island 46, to interface and control island 44, to external MU SRAM block 53, to 32-bit DDR PHY I/O blocks 21 and 22, and to external DRAM integrated circuits 6 and 7. At this point in the operational example, the packet header portions and their associated payload portions are stored in different places. The payload portions of fast-path packets are stored in internal SRAM in MU block 52, whereas the payload portions of exception packets are stored in external SRAM in external DRAMs 6 and 7.

ME island 40 informs second NBI island 37 where the packet headers and the packet payloads can be found and provides the second NBI island 37 with an egress packet descriptor for each packet. The egress packet descriptor indicates a queuing strategy to be used on the packet. Second NBI island 37 uses the egress packet descriptor to read the packet headers and any header modification from ME island 40 and to read the packet payloads from either internal SRAM 52 or external DRAMs 6 and 7. Second NBI island 37 places packet descriptors for packets to be output into the correct order. For each packet that is then scheduled to be transmitted, the second NBI island 37 uses the packet descriptor to read the header portion and any header modification and the payload portion and to assemble the packet to be transmitted. The header modification is not actually part of the egress packet descriptor, but rather it is stored with the packet header by the ME when the packet is presented to the NBI. The second NBI island 37 then performs any indicated packet modification on the packet. The resulting modified packet then passes from second NBI island 37 and to egress MAC island 38.

Egress MAC island 38 buffers the packets, and converts them into symbols. The symbols are then delivered by conductors from the MAC island 38 to the four SerDes I/O blocks 13-16. From SerDes I/O blocks 13-16, the 100 Gbps outgoing packet flow passes out of the IB-NFP integrated circuit 1 and to the switch fabric (not shown) of the router. Twelve virtual output ports are provided in the example of FIG. 1.

Figure 2:
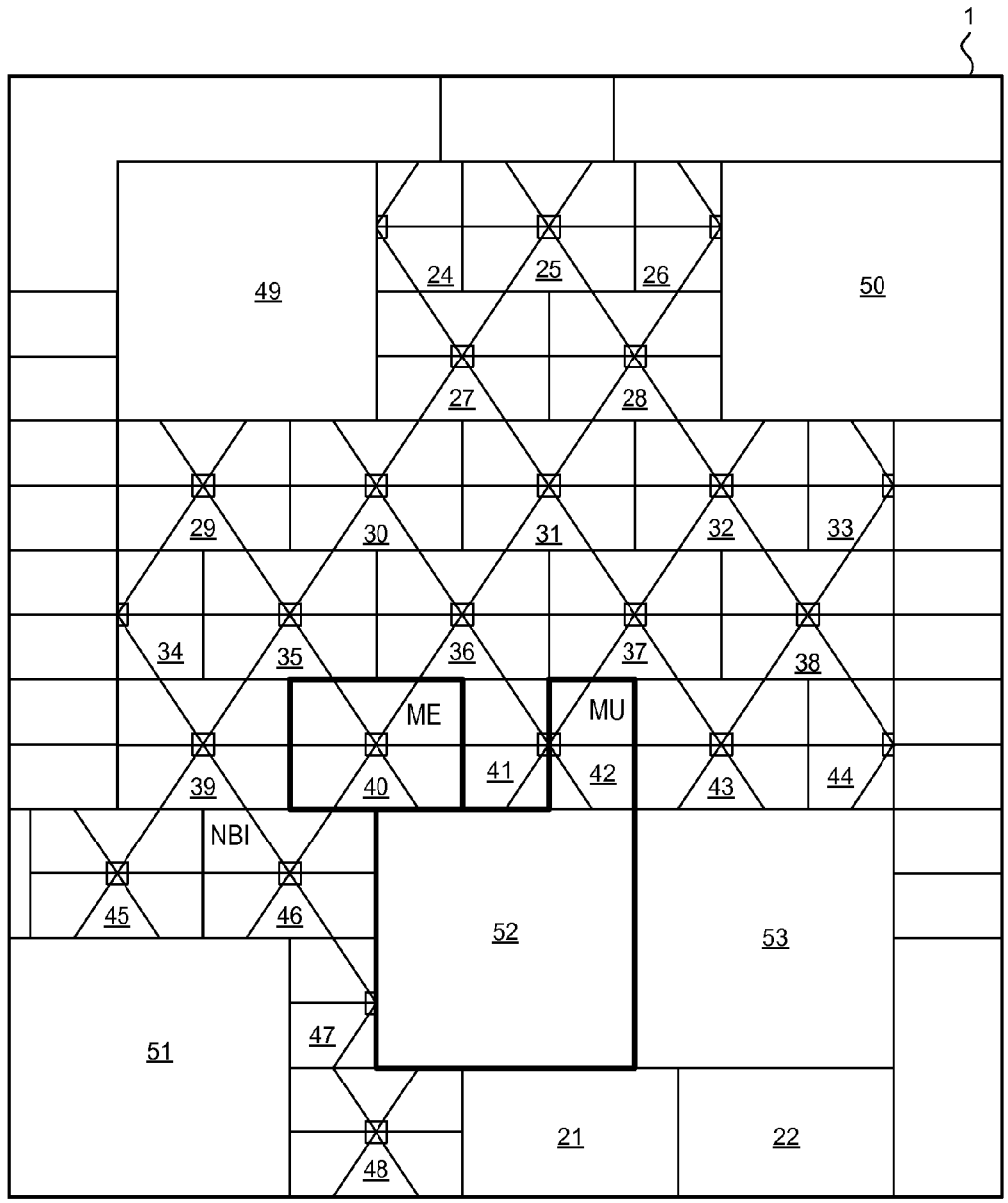
FIG. 2 shows the Command-Push-Pull (CPP) data bus structure that interconnects functional circuitry in the islands of FIG. 1.

General Description of the CPP Data Bus: FIG. 2 shows the Command-Push-Pull (CPP) data bus structure that interconnects functional circuitry in the islands of FIG. 1. Within each full island, the CPP data bus actually includes four mesh bus structures, each of which includes a crossbar switch that is disposed in the center of the island, and each of which includes six half links that extend to port locations at the edges of the island, and each of which also includes two links that extend between the crossbar switch and the functional circuitry of the island. These four mesh bus structures are referred to as the command mesh bus, the pull-id mesh bus, and data0 mesh bus, and the data1 mesh bus. The mesh buses terminate at the edges of the full island such that if another identical full island were laid out to be adjacent, then the half links of the corresponding mesh buses of the two islands would align and couple to one another in an end-to-end collinear fashion to form the staggered pattern illustrated in FIG. 2. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

General Description of a Write That Results in a Pull: In one example of a CPP bus transaction, a microengine (a master) on ME island 40 uses the data bus interface of ME island 40 to perform a write operation to a hardware engine (a target) on MU half island 42, where the MU island 42 responds by performing a pull operation. To do this, the microengine on the ME island 40 uses the data bus interface to output a bus transaction value onto the command mesh of the CPP data bus. The format of the bus transaction value is as set forth in FIG. 3. A bus transaction value 54 includes a metadata portion 55 and a payload portion 56 as shown. The metadata portion 55 includes a final destination value 57 and a valid bit 58.

The functional circuitry that receives the bus transaction value and the data to be written is referred to as the "target" of the write operation. The write command is said to be "posted" by the master onto the command mesh. As indicated in FIG. 3, the write command includes a metadata portion and a payload portion. The metadata portion includes the 6-bit final destination value. This final destination value identifies an island by number, where the island identified is the final destination of the bus transaction value. The final destination value is used by the various crossbar switches of the command mesh to route the bus transaction value (i.e., the command) from the master to the appropriate target, in this case to a hardware engine on MU island 42. All bus transaction values on the command mesh that originate from the same island that have the same final destination value will traverse through the configurable command mesh along the same one path all the way to the indicated final destination island.

A final destination island may include more than one potential target. The 4-bit target field of payload portion indicates which one of these targets in the destination island it is that is the target of the command. In the case of MU island 42, this 4-bit field indicates one of several hardware engines of the MU island 42. The 5-bit action field of the payload portion indicates that the command is a write. The 14-bit data reference field is a reference usable by the master to determine where in the master the data is to be found. The address field indicates an address in the target where the data is to be written. The length field indicates the amount of data.

The target (a hardware engine of MU island 42) receives the write command from the command mesh and examines the payload portion of the write command. From the action field the hardware engine in MU island 42 determines that it is to perform a write action. To carry out this action, the hardware engine (i.e., posts) a bus transaction value called a pull-id onto the pull-id mesh. FIG. 3 shows the format of the overall bus transaction value, and FIG. 5 shows the format of the payload. The final destination field of the metadata portion indicates the island where the master (in this case, a microengine on the ME island 40) is located. The target port field identifies which sub-circuit target it is within the target's island that is the target of the command. In this example, the target island is the MU island 42 so the sub-circuit is a hardware engine on the MU island. The pull-id is communicated through the pull-id mesh back to ME island 40.

The master in the ME island receives the pull-id from the pull-id mesh and uses the content of the data reference field of the pull-id to find the data. In the overall write operation, the master in the ME island knows the data it is trying to write into the MU island. The data reference value that is returned with the pull-id is used by the master in the ME island as a flag to match the returning pull-id with the write operation the ME had previously initiated.

The master on ME island 40 responds by sending the identified data to the target on MU island 42 across one of the data meshes data0 or data1 as a "pull" data bus transaction value. The term "pull" means that the data of the operation passes from the master (a microengine on the ME island) to the target (a hardware engine on the MU island). The term "push" means that the data of the operation passes from the target to the master. The format of the "pull" data bus transaction value sent in this sending of data is also as indicated in FIG. 3. The format of the payload portion in the case of the payload being pull data is as set forth in FIG. 7. The first bit of the payload portion is asserted. This bit being a digital high indicates that the transaction is a data pull as opposed to a data push. The target on MU island 42 then receives the data pull bus transaction value across the data1 or data0 mesh. The data received by the hardware engine as the data for the write is the content of the data field (the data field of FIG. 7) of the pull data payload portion.

FIG. 6 is a generic description of the data payload, and FIG. 7 is a description of the data payload when the first bit of the data payload indicates the data payload is for a pull transaction. FIG. 8 is a description of the data payload when the first bit of the data payload indicates that payload is for a push transaction.

General Description of a Read That Results in a Push: In another example, a master (for example, a microengine on ME island 40) uses the data bus interface of island 40 to perform a read operation from a target (for example, a hardware engine on MU island 42), where the target responds by performing a push operation. The microengine circuitry in ME island 40 uses the data bus interface of island 40 to output (to "post") a bus transaction value onto the command mesh bus of the configurable mesh CPP data bus. In this case, the bus transaction value is a read command to read data from the target hardware engine in MU island 42. The format of the read command is as set forth in FIGS. 3 and 4. The read command includes a metadata portion and a payload portion. The metadata portion includes the 6-bit final destination value that indicates the island where the target is located. The action field of the payload portion of the read command indicates that the command is a read. The 14-bit data reference field is usable by the master as a flag to associate returned data with the original read operation the master previously initiated. The address field in the payload portion indicates an address in the target where the data is to be obtained. The length field indicates the amount of data.

The target (a hardware engine of MU island 42) receives the read command and examines the payload portion of the command. From the action field of the command payload portion the target determines that it is to perform a read action. To carry out this action, the target uses the address field and the length field to obtain the data requested. The target then pushes the obtained data back to the master across data mesh data1 or data0. To push the data, the target outputs a push bus transaction value onto the data1 or data0 mesh. FIG. 3 sets forth the format of the overall push bus transaction value and FIG. 8 sets forth the format of the payload portion of this push bus transaction value. The first bit of the payload portion indicates that the bus transaction value is for a data push, as opposed to a data pull. The master (the microengine of ME island 40) receives the bus transaction value of the data push from the data mesh bus. The master in the ME island then uses the data reference field of the push bus transaction value to associate the incoming data with the original read command, and from the original read command determines where the pushed data (data in the date field of the push bus transaction value) should be written into the master. The master then writes the content of the data field into the master's memory at the appropriate location.

Figure 9:
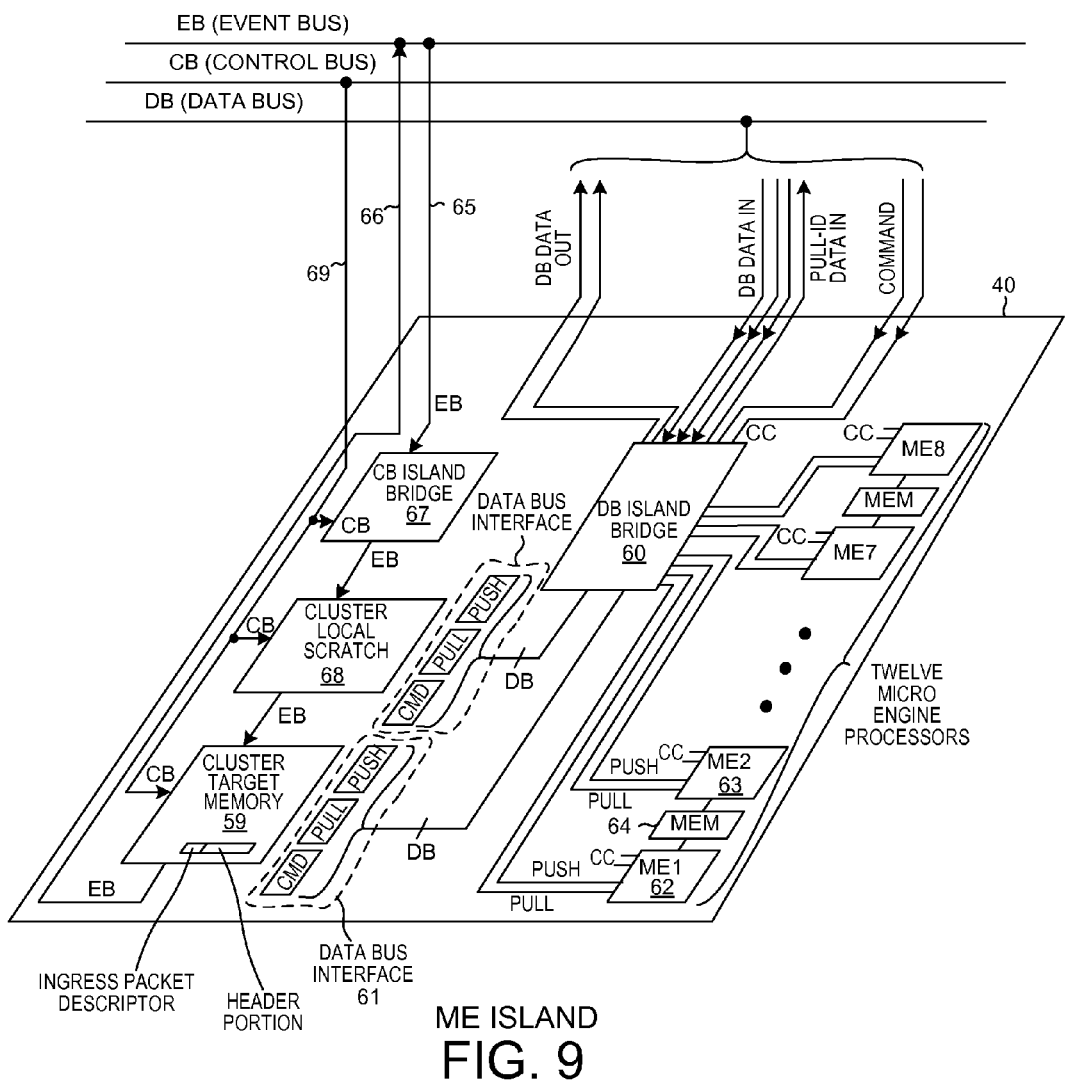
FIG. 9 is a simplified diagram of microengine (ME) island 40 of the IB-NFP integrated circuit of FIG. 1.

ME Island: FIG. 9 is a diagram of the microengine (ME) island 40. In the operational flow of FIG. 1, packet headers and the associated preclassification results are DMA transferred from the ingress NBI island 46 across the configurable mesh data bus and into the Cluster Target Memory (CTM) 59 of ME island 40. A DMA engine in the ingress NBI island 46 is the master and CTM 59 in ME island 40 is the target for this transfer. The packet header portions and the associated ingress packet descriptors pass into the ME island via data bus island bridge 60 and data bus interface circuitry 61. Once in the CTM 59, the header portions are analyzed by one or more microengines. The microengines have, through the DB island bridge 60, a command out interface, a pull-id in interface, a pull-data out interface, and a push data in interface. There are six pairs of microengines, with each pair sharing a memory containing program code for the microengines. Reference numerals 62 and 63 identify the first pair of microengines and reference numeral 64 identifies the shared memory. As a result of analysis and processing, the microengines modify each ingress packet descriptor to be an egress packet descriptor. Each egress packet descriptor includes: 1) an address indicating where and in which ME island the header portion is found, 2) an address indicating where and in which MU island the payload portion is found, 3) how long the packet is, 4) sequence number of the packet in the flow, 5) an indication of which queue the packet belongs to (result of the packet policy), 6) an indication of where the packet is to be sent (a result of the packet policy), 7) user metadata indicating what kind of packet it is.

Memory errors and other events detected in the ME island are reported via a local event ring and the global event chain back to the ARM island 25. A local event ring is made to snake through the ME island 40 for this purpose. Event packets from the local event chain are received via connections 65 and event packets are supplied out to the local event chain via connections 66. The CB island bridge 67, the cluster local scratch 68, and CTM 59 can be configured and are therefore coupled to the control bus CB via connections 69 so that they can receive configuration information from the control bus CB.

Figure 10:
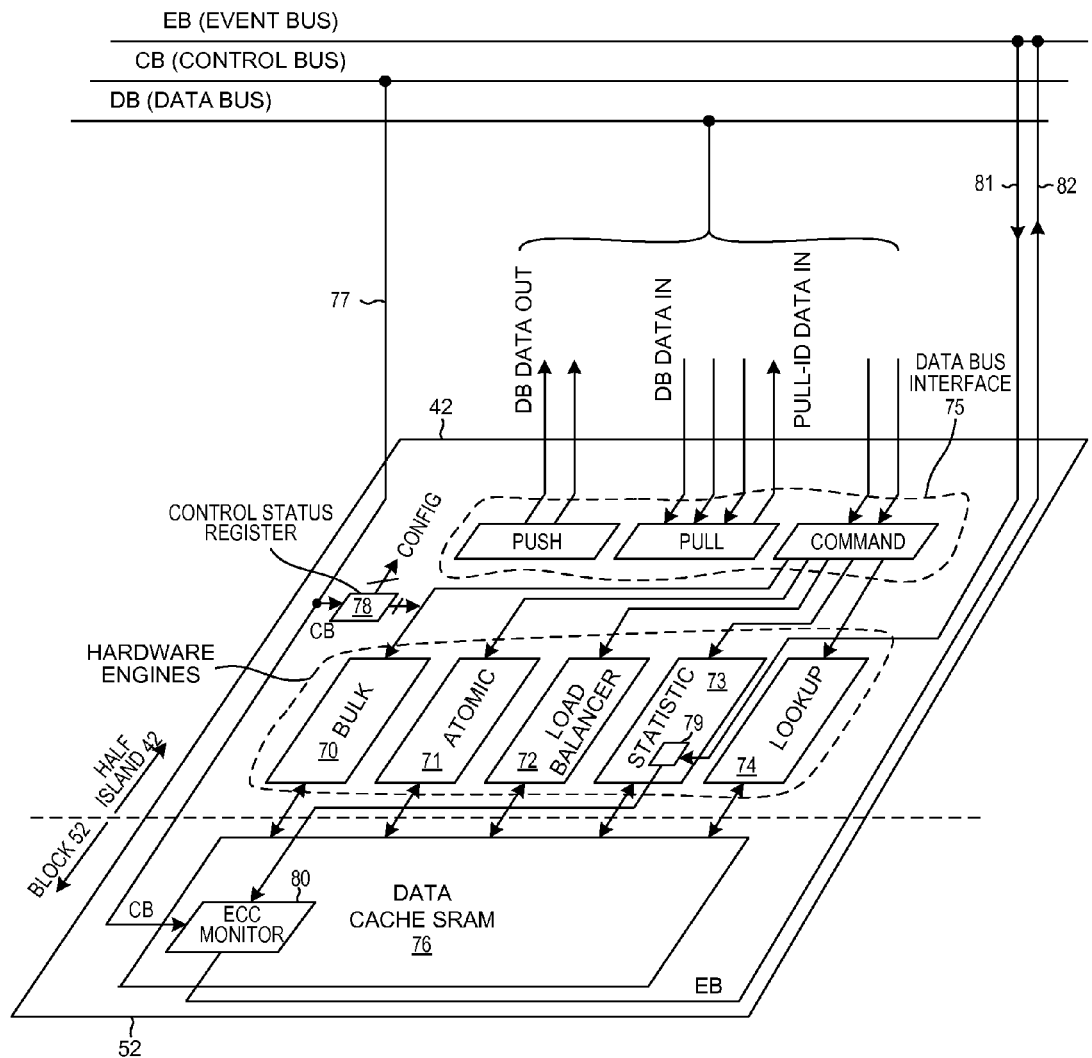
FIG. 10 is a simplified diagram of the memory unit (MU) half island 42 and memory unit (MU) block 52 of the IB-NFP integrated circuit of FIG. 1.

MU Island: FIG. 10 is a diagram of MU half island 42 and SRAM block 52. MU half island 42 includes several hardware engines 70-74. In the operational example, fast path packet payloads are DMA transferred directly from ingress NBI island 46 and across the configurable mesh data bus, through data bus interface 75 of half island 42, and into the data cache SRAM 76 of block 52. The ingress NBI DMA engine issues a bulk write command across the configurable mesh data bus to the bulk transfer engine 70. The destination is the MU island 42. The action is bulk write. The address where the data is to be written into the MU island is the address taken out of the appropriate buffer list. The bulk write command received at the MU is a bulk write, so the data bus interface 75 presents the command to the bulk engine 70. The bulk engine 70 examines the command which is a write. In order to perform a write the bulk engine needs data, so the bulk engine issues a pull-id through the pull portion of interface 75, which in turn issues a pull-id back onto the configurable mesh data bus. The DMA engine in NBI island 46 receives the pull-id. Part of the pull-id is a data reference which indicates to the DMA engine which part of the packet is being requested as data. The DMA engine uses the data reference to read the requested part of the packet, and presents that across the data part of the data bus back to bulk engine 70 in MU island 42. The bulk engine 70 then has the write command and the packet data. The bulk engine 70 ties the two together, and it then writes the packet data into SRAM 76 at the address given in the write command. In this way, fast path packet payload portions pass from DMA engine in the ingress NBI island, across the configurable mesh data bus, through the data bus interface 75, through a bulk transfer engine 70, and into data cache SRAM 76 of block 52. In a similar fashion, exception packet payload portions pass from the DMA engine in ingress NBI island 46, across the configurable mesh data bus, through the data bus interface of half island 44, through the bulk transfer engine of half island 44, and through DDR PHYs 21 and 22, and into external memories 6 and 6.

Various parts of MU island 42 are configurable by changing the contents of registers and memory via the control bus CB and connections 77 and control status registers 78. Errors detected on the MU island by circuits 79 and 80 are reported into a local event ring. Event packets from the local event ring are received via input connections 81 and the MU island outputs event packets to the local even ring via output connections 82.

Figure 11:
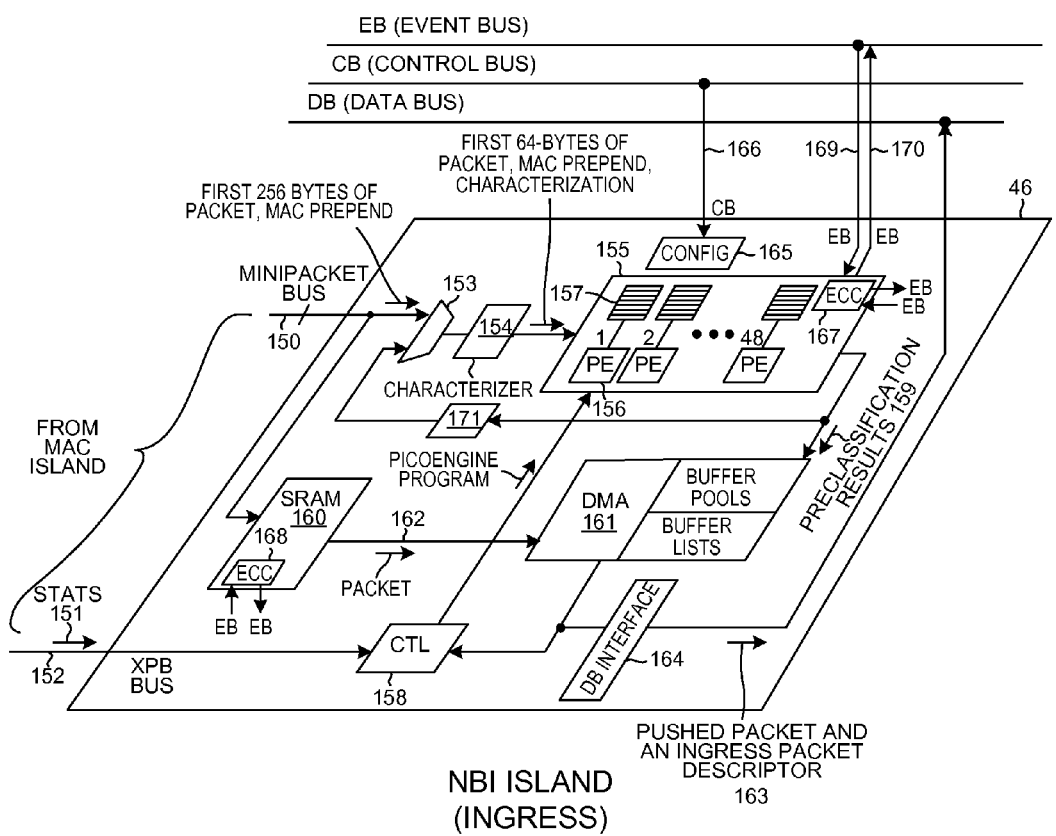
FIG. 11 is a simplified diagram of the Network Bus Ingress (NBI) island 46 of the IB-NFP integrated circuit of FIG. 1.

NBI Island: FIG. 11 is a diagram of ingress NBI island 46. Ingress NBI island 46 receives the MAC prepend and the minipackets via dedicated connections 150 from the ingress MAC island 46. The first 256 bytes of the packet and the MAC prepend pass through multiplexing circuitry 153 and to a characterizer 154. Characterizer 154 outputs characterization information, the first sixty-four bytes of the packet, and the MAC prepend. This is passed to a pool 155 of forty-eight picoengines. Each picoengine executes a program stored in an associated instruction control store. Reference numeral 156 identifies the first picoengine and reference numeral 157 identifies its instruction control store. The program in the instruction control store for each picoengine can be updated and changed under software control via control block 158. Control block 158 is also usable to receive the statistics information 151 from the MAC island via XPB bus connections 152. To perform deeper and deeper analysis into the header structure of an incoming packet, the output of the pool 155 can be passed back through a tunnel recirculation path and tunnel recirculation FIFO 171 to the characterizer 154 in an iterative fashion. Pool 155 outputs preclassification results 159.

Figure 12:
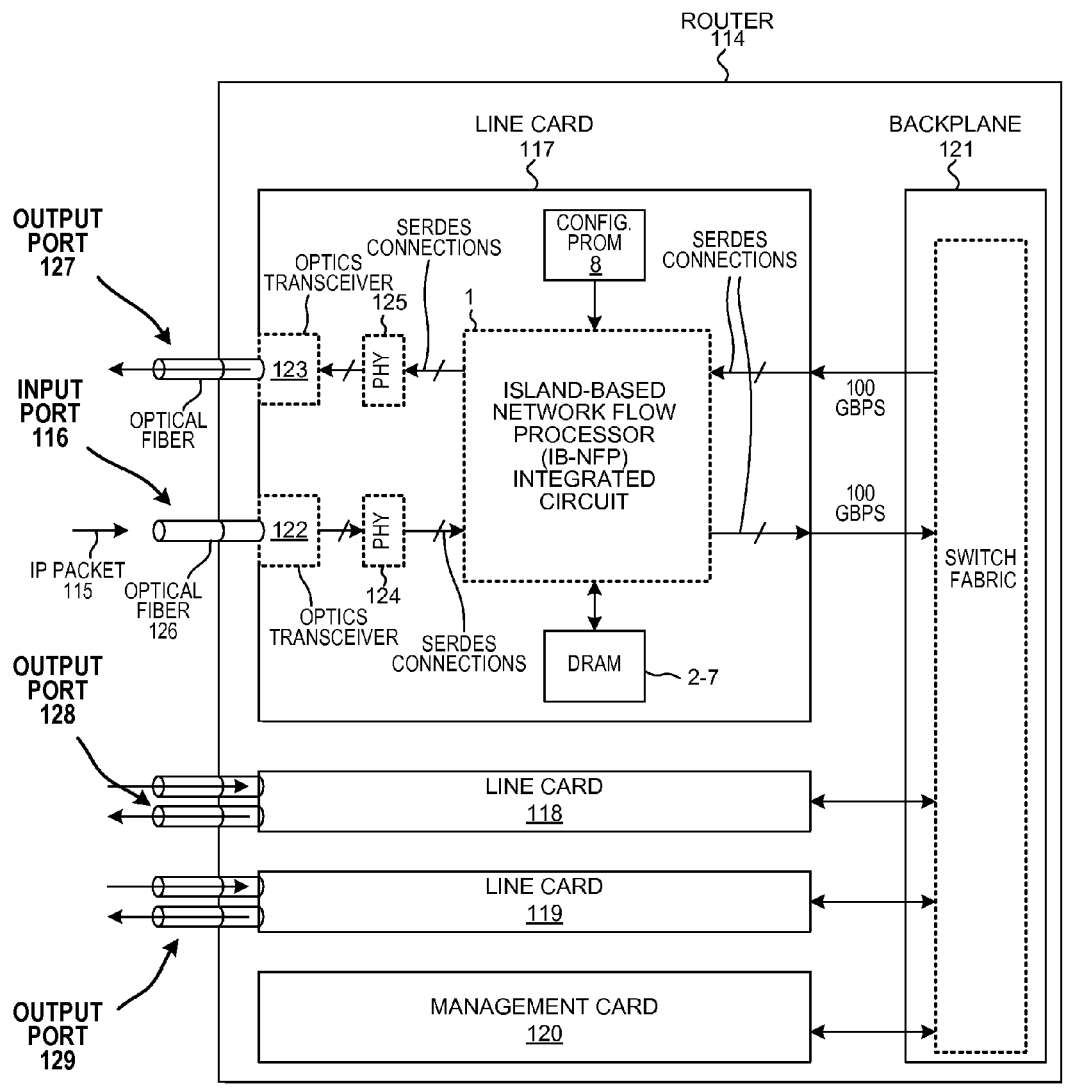
FIG. 12 is a simplified diagram of a router including the IB-NFP integrated circuit of FIG. 1.

FIG. 12 illustrates a router utilizing the Island-Based Network Flow Processor (IB-NFP) integrated circuit 1 of FIG. 2. Router 114 receives an IP packet 115 on an input port of the router. The input port is one of many virtual ports of a physical input port 116. Router 114 includes a plurality of line cards 117-119 and a management card 120 that fit into and attach to a backplane 121. The line cards are identical. Line card 117 includes optics transceivers 122 and 123, PHYs 124 and 125, an instance of the Island-Based Network Flow Processor (IB-NFP) integrated circuit 1 of FIG. 2, configuration PROM 8, and DRAM integrated circuits 2-7. The IP packet 115 is communicated through optical fiber 126, through optics transceiver 122, through PHY 124, and to IB-NFP 1. The IB-NFP 1 in this router looks at the IP destination address of the packet and identifies one of several output ports to which the IP packet is to be routed. The IB-NFP then forwards the IP packet so that the IP packet will be output from the router via the determined output port. In the illustrated example, the output port may be one of many virtual output ports of physical output port 127, or may be one of the many virtual output ports of physical output port 128, or may be one of the many virtual output ports of physical output port 129. For additional information on the IB-NFP, the IB-NFP's islands, the CPP data bus, the CPP meshes, operation of the CPP data bus, and the different types of bus transactions that occur over the CPP data bus, see: U.S. patent application Ser. No. 13/399,433 entitled "Staggered Island Structure in an Island-Based Network Flow Processor" filed on Feb. 17, 2012 (the entire subject matter of which is incorporated herein by reference).

Figure 13:
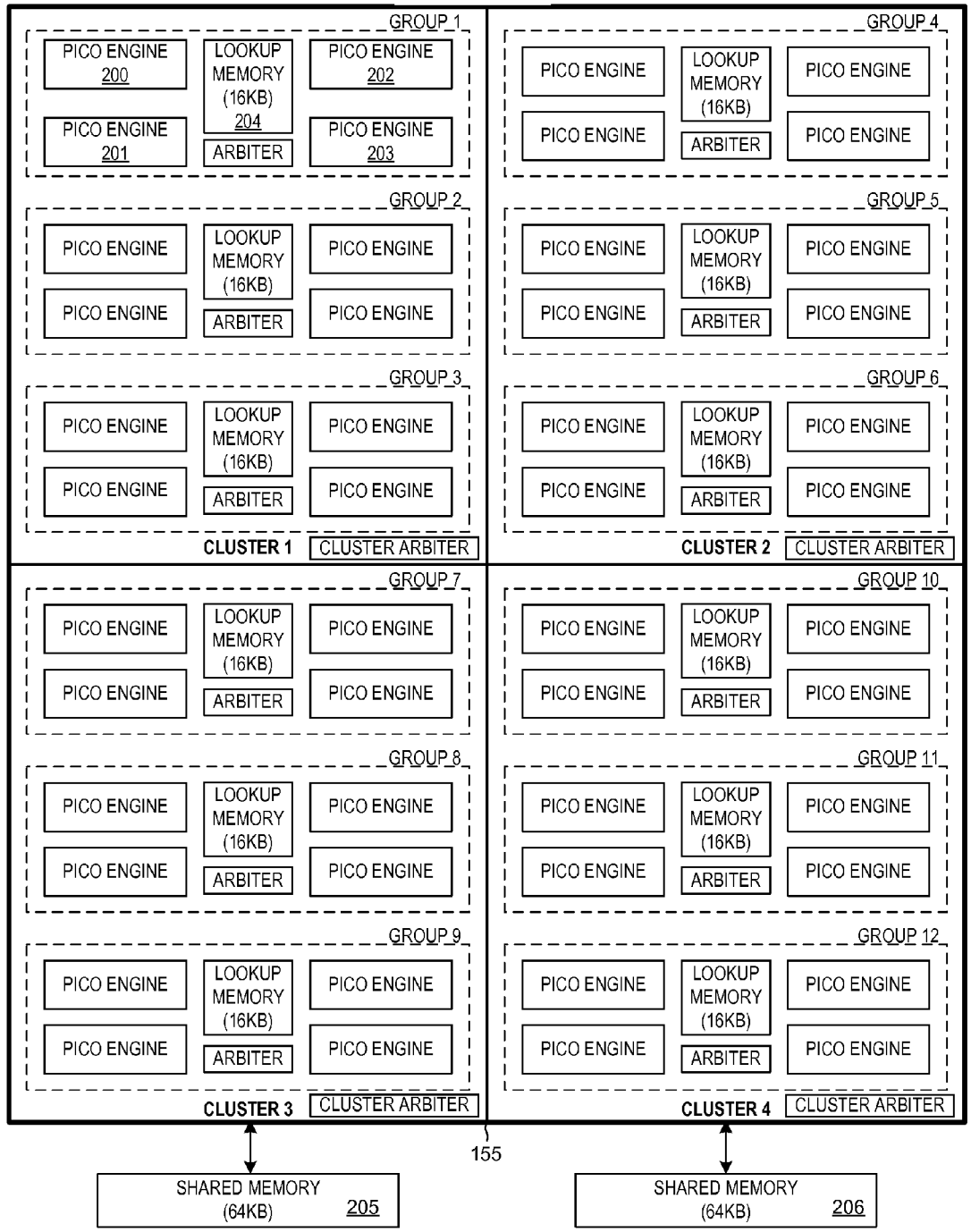
FIG. 13 is a simplified diagram of a Picoengine (PE) pool.

Picoengine Pool: FIG. 13 is a simplified diagram of Picoengine (PE) pool 155. Picoengine pool 155 includes four clusters. Each cluster includes a cluster arbiter and three groups. Each group includes four PEs (processors), a lookup memory (a local transactional memory) and an arbiter. For example, "cluster 1" includes "group 1", "group 2", and "group 3". "Group 1" includes four PEs 200-203, a local memory 204, and a group arbiter. Each group arbiter within a cluster communicates with the cluster arbiter which communicates with the shared memories 205 and 206. Lookup memory 204 has 16 kB of storage space. The picoengine pool includes a shared memory (shared transactional memory). For example, shared memories 205 and 206 are included in the picoengine pool 155 illustrated in FIG. 13. Shared memories 205 and 206 include 64 kB of storage space. All PEs in the picoengine pool can access each shared memory 205 and 206. Alternatively, only PEs with the same group as a local memory can access the local memory. Accordingly, local memories can provide fast access time due to the limited number of PEs the local memory has to serve. For example, local memory 204 can serve data to PEs 200-203 in approximately 4 cycles. On the other hand, shared memories 205 and 206 are required to serve data to all forty eight picoengines and therefore serve data less rapidly. Being external from the picoengine pool 155 allows the shared memories 205 and 206 to have increase storage space. Specific operations require more than the 16 kB of storage space provided by the local memory. To execute these specific operations a PE within the picoengine pool 155 can access shared memories 205 and 206 at a slightly slower data access rate. The PE can execute all other operations by accessing the fast local memory within the PE's group.

Figure 14:
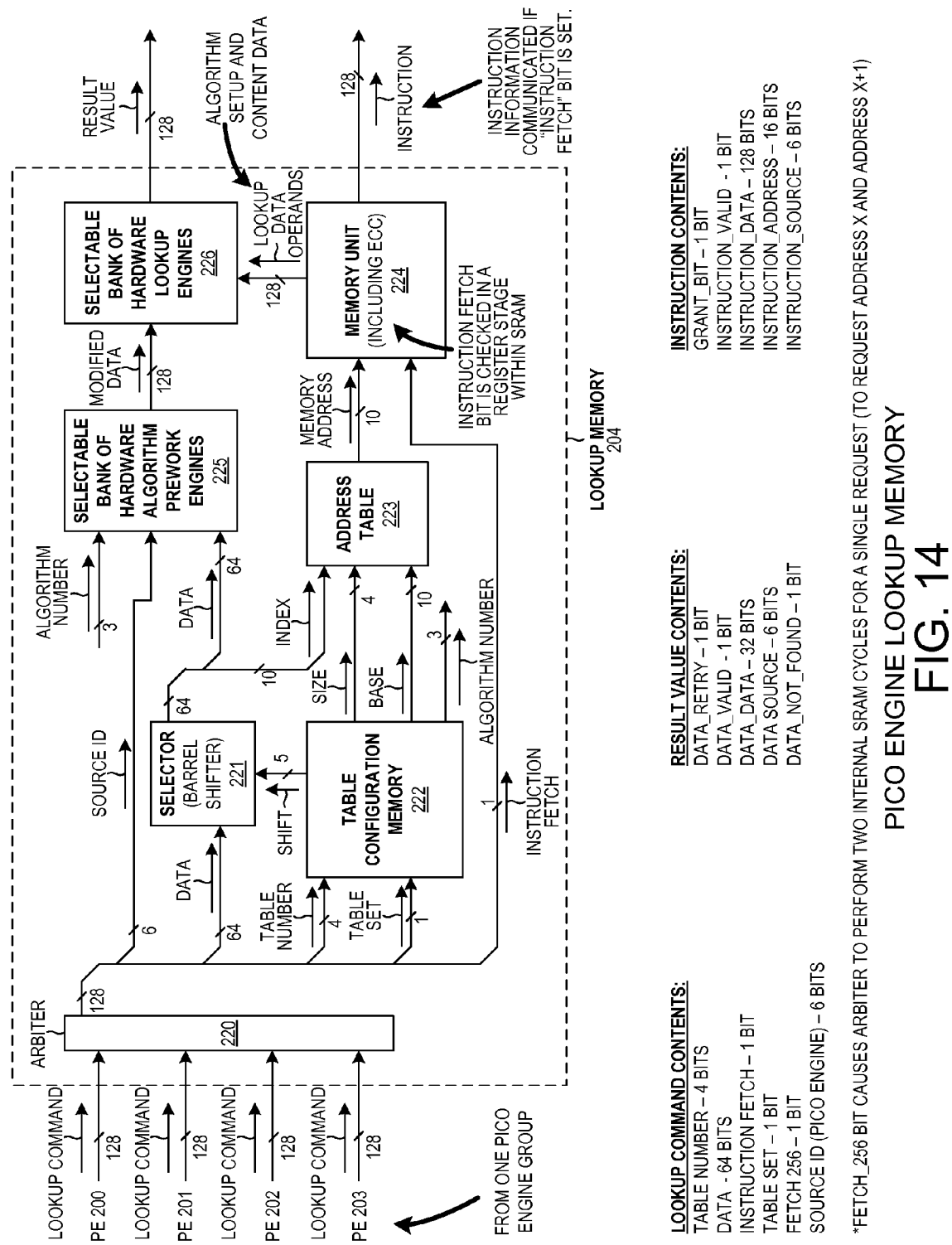
FIG. 14 is a more detailed diagram of lookup memory 204 as shown in FIG. 13.

Local Transactional Memory (Lookup Memory): FIG. 14 is a more detailed diagram of lookup memory 204 shown in FIG. 13. Lookup memory 204 includes an arbiter 220, a selector 221, a table configuration memory 222, an address table 223, a memory unit 224, a selectable bank of hardware algorithm prework engines 225, and a selectable bank of hardware lookup engines 226. Lookup memory 204 is included in "Group 1" along with picoengines 200-203, all of which can send a lookup command to lookup memory 204. Lookup commands from each picoengine are received by arbiter 220. Arbiter 200 stores incoming lookup commands and determines the order in which the incoming lookup commands are processed. A lookup command is 128-bits wide and includes a table number value, a table set value, data, a source identification ("Source ID") value, and a instruction fetch value. The source identification value is routed to the selectable bank of hardware algorithm prework engines 225. The data is routed to selector 221. The fetch instruction is routed to memory unit 224. The table number value and the table set value are routed to the table configuration memory 222. In response, table configuration memory 222 generates a shift value, a size value, a base value, and an algorithm number value. In one example, table configuration memory 222 is a lookup table implemented as a set of flip-flops. The table number value and the table set value are pointers to the desired memory location.

The shift value is routed to selector 221. In one example, selector 221 is a barrel shifter that rotates the data according to the shift value provided by table configuration memory 222. The rotation of the data is performed such that an index value included in the data is shifted to the lowest bits within the data. The index value is routed to the address table 223. The lookup data included in the data is routed to the selectable bank of hardware algorithm prework engines 225. The rotated data is then output by the selector 221.

Figure 16:
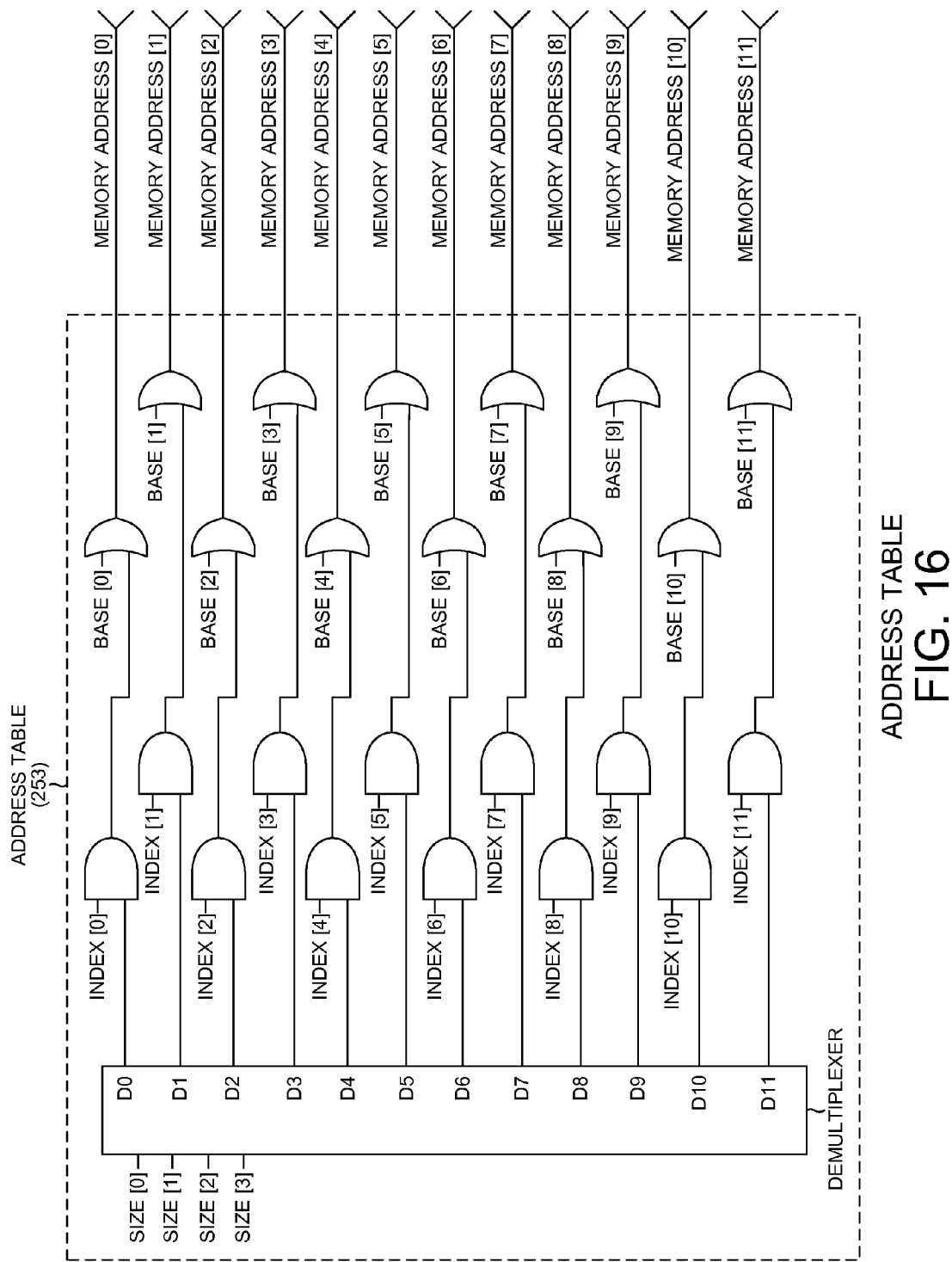
FIG. 16 is a more detailed diagram of address table 253 shown in FIGS. 14 and 15.

The size value and the base value (from the table configuration memory 222) and the index value (from selector 221) are routed to address table 223. In response, address table 223 generates a memory address. In one example, address table 223 is implemented as a "Mask and OR" circuit illustrated in FIG. 16. As shown in FIG. 16, the address table 253 includes a demultiplexer and an array of AND gates and OR gates. The four bits of the size value are input to the demultiplexer and generate up to sixteen unique digital logic levels (D0-D15). Each digital logic level (D0-D15) are ANDED with the corresponding bit of the index value. The output of each AND gate is ORed with the corresponding bit of the base value. The output of each OR gate is a corresponding bit of the memory address. In the present examples, not all of the demultiplexer outputs are utilized. The operation of the demultiplexer is shown in FIG. 17. The demultiplexer performs a decode and mask operation.

The memory address (from address table 223) and the instruction fetch value (included in the lookup command) are routed to memory unit 224. In response, memory unit 224 provides lookup data operands to selectable bank of hardware lookup engines 226. In the event that the instruction fetch value is asserted, the memory unit 224 also provides an instruction to the output bus. In one example, the instruction fetch value is checked by a register included in the memory unit 224.

Figure 18:
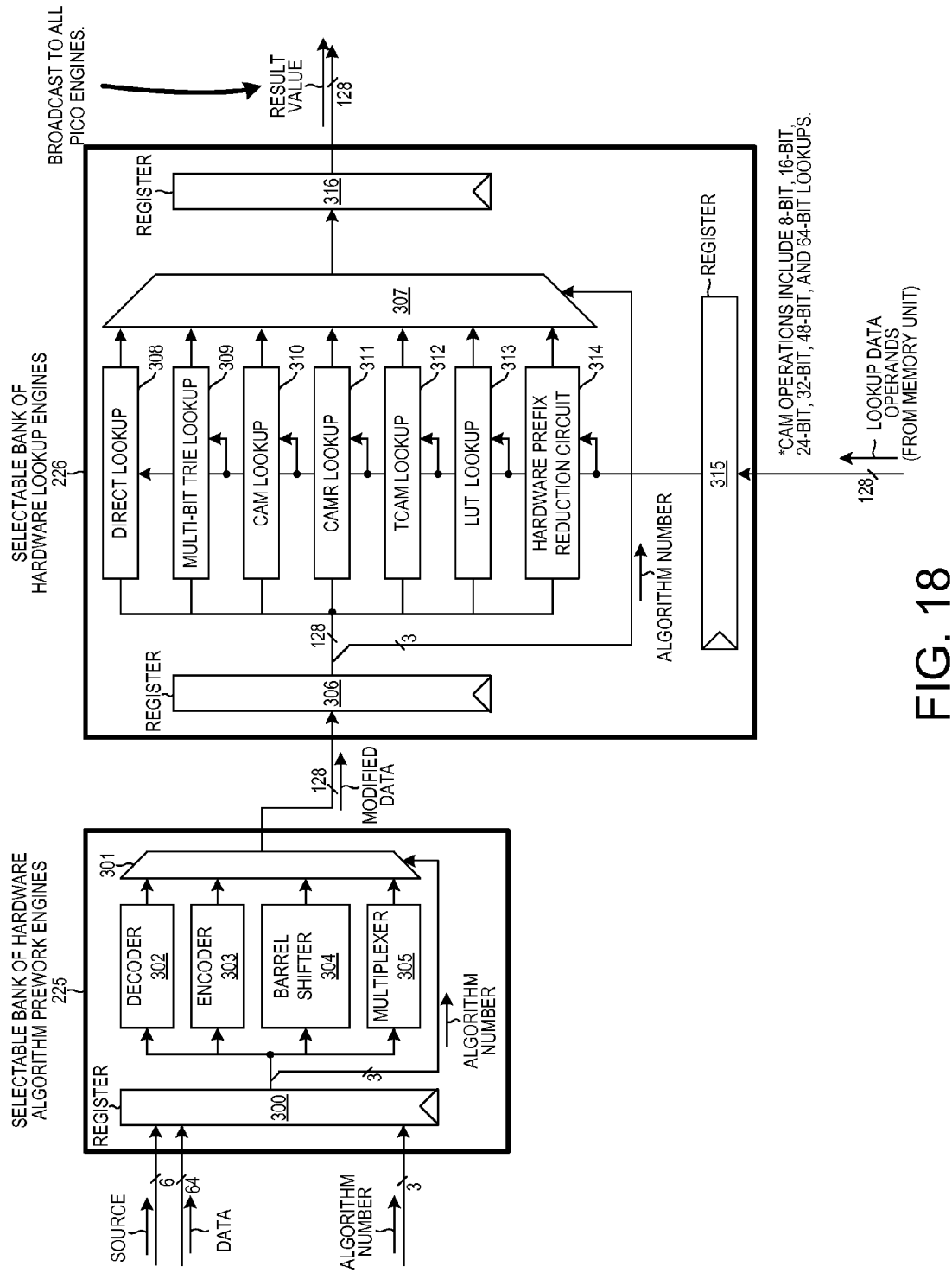
FIG. 18 is a more detailed diagram of selectable bank of hardware algorithm prework engines 225 and selectable bank of hardware lookup engines 226.

The lookup data (from selector 221), the source identification value (included in the lookup command), and the algorithm number value (from the table configuration memory 222) are routed to the selectable bank of hardware algorithm prework engines 225. In response, the selectable bank of hardware algorithm prework engines provides modified data to selectable bank of hardware lookup engines 226. A more detailed description of selectable bank of hardware algorithm prework engines 225 and selectable bank of hardware lookup engines 226 is provided in FIG. 18. Selectable bank of hardware algorithm prework engines 225 includes register 300, multiplexer 301, decoder 302, encoder 303, barrel shifter 304, and multiplexer 305 (all of which are herein referred to as "hardware algorithm prework engines"). Selectable bank of hardware lookup engines 226 includes register 306, multiplexer 307, direct hardware lookup 308, multi-bit hardware lookup 309, CAM hardware lookup 310, CAMR hardware lookup 311, TCAM hardware lookup 312, LUT hardware lookup 313, and hardware prefix reduction circuit 314, register 315, and register 316. For additional details on hardware lookup engines, and on a network device, see: U.S. patent application Ser. No. 13/675,394, by Gavin J. Stark, entitled "TRANSACTIONAL MEMORY THAT PERFORMS A PMM 32-BIT LOOKUP OPERATION", filed Nov. 13, 2012 (the entire subject matter of which is incorporated herein by reference).

The source identification value, the lookup data, and the algorithm number value are stored in register 300. The source identification value and the lookup data are routed to an input terminal of multiplexer 301. The algorithm number value is routed to a selector input of the multiplexer 301. The lookup data and source identification value are routed to the various hardware algorithm prework engines included in the selectable bank of hardware algorithm prework engines 225. The selected hardware algorithm prework engine then outputs modified lookup data to selectable bank of hardware lookup engines 226 via multiplexer 301. The example of hardware algorithm prework engines described above are only exemplary. This disclosure is not limited to this list of hardware algorithm prework engines.

The modified lookup data is stored in register 306. The modified lookup data still includes the source identification value and the algorithm number value. The algorithm number value is routed to a selector input of multiplexer 307 and the remainder of the modified lookup data is routed to the various hardware lookup engines 308-314 included in the selectable bank of hardware lookup engines 226. Lookup data operands (from the memory unit 224) are stored in register 315. The lookup data operands are then routed to each of the hardware lookup engines 308-314. The selected hardware lookup engine then performs the lookup operation using the remainder of the modified lookup data and the lookup data operands. In response to performing the lookup operation, the selected hardware lookup engine outputs a result value to the bus via multiplexer 307. The contents of the result value are described in FIG. 19. The contents of a lookup command are described in FIG. 20. The contents of an instruction are described in FIG. 21. FIGS. 22-24 describe the contents of the lookup data operands for various hardware lookup engines. In one example, a picoengine communicates a lookup command to the transactional memory to perform an IP address hash lookup. In another example, a picoengine communicates a lookup command to the transactional memory to perform a direct port lookup.

Figure 15:
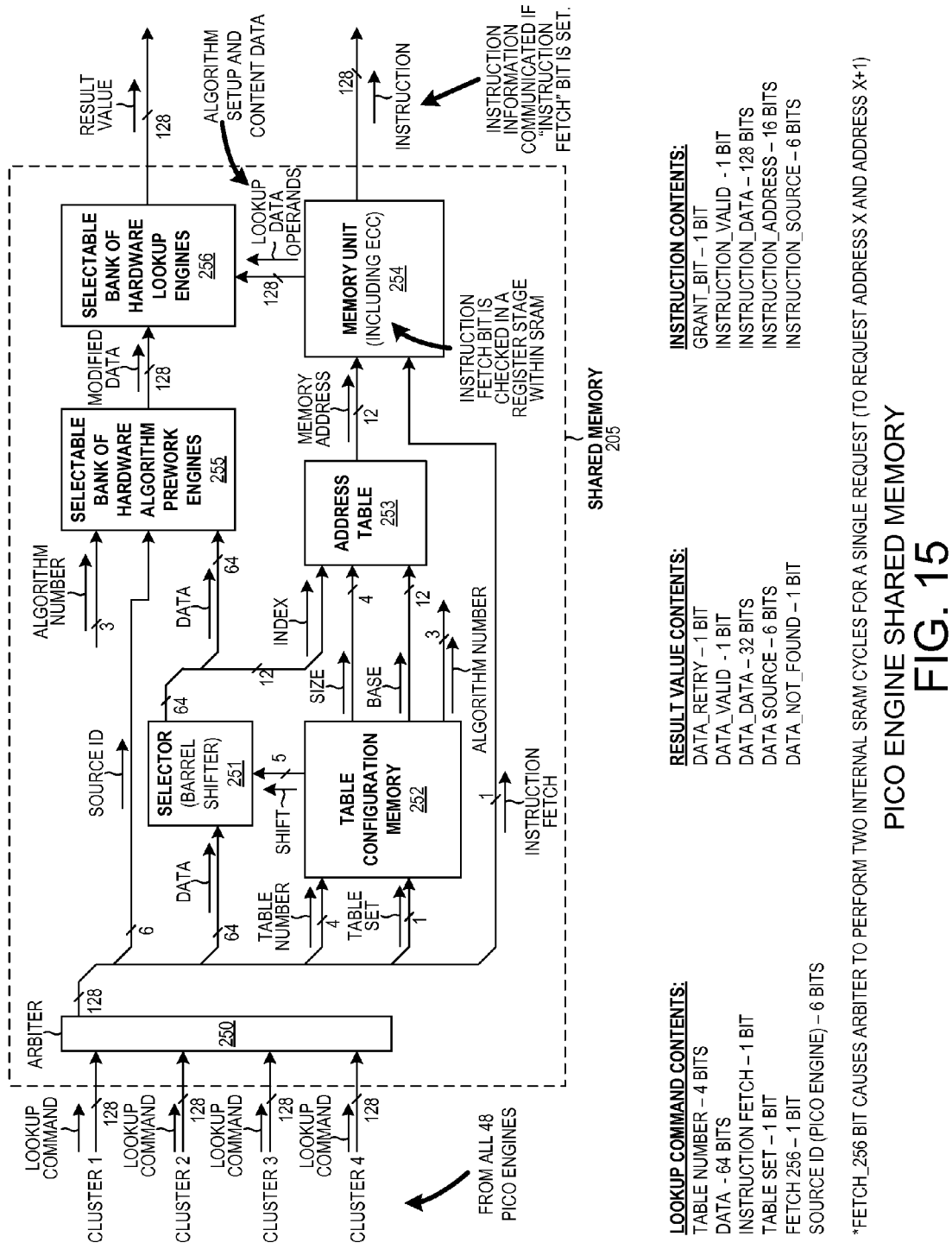
FIG. 15 is a more detailed diagram of shared lookup memory 205 as shown in FIG. 13.

Shared Transactional Memory (Shared Memory): FIG. 15 is a more detailed diagram of shared memory 205 and 206 shown in FIG. 13. Shared memories 205 and 206 are similar to local memory 204, however the shared memories are accessible to all picoengines in the picoengine pool.

Figure 25:
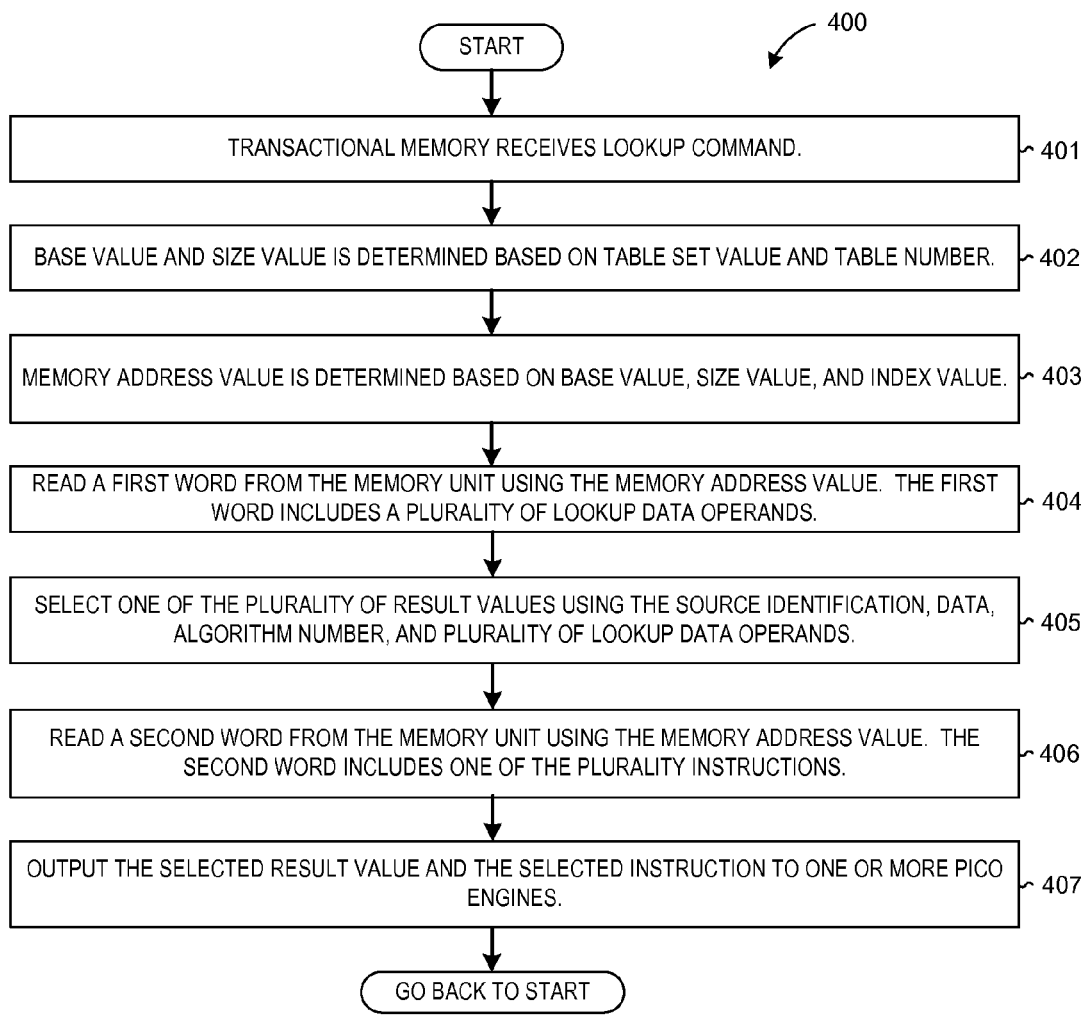
FIG. 25 is a flowchart illustrating the performed during a lookup operation.

FIG. 25 is a flowchart 400 describing the steps included in a picoengine transactional memory lookup. In step 401, the transactional memory receives a lookup command. A base value and a size value is determined based on a table set value and a table number value which are both included in the lookup command (Step 401). In step 403, a memory address value is determined based on the base value, the size value, and an index value. The index value is determined by a selector circuit that selects a part of the data included in the lookup command to generate the index value. A first word is read from the memory unit using the memory address (Step 404). In step 405, one of a plurality of result values is selected based on the source identification value, the data, the algorithm number value, and the plurality of lookup data operands. A second word is read from the memory unit using the memory address value (Step 406). The second word includes one of the plurality of instructions. In step 407, the transactional memory outputs the selected result value and the selected instruction to one or more picoengines.

Figure 26:
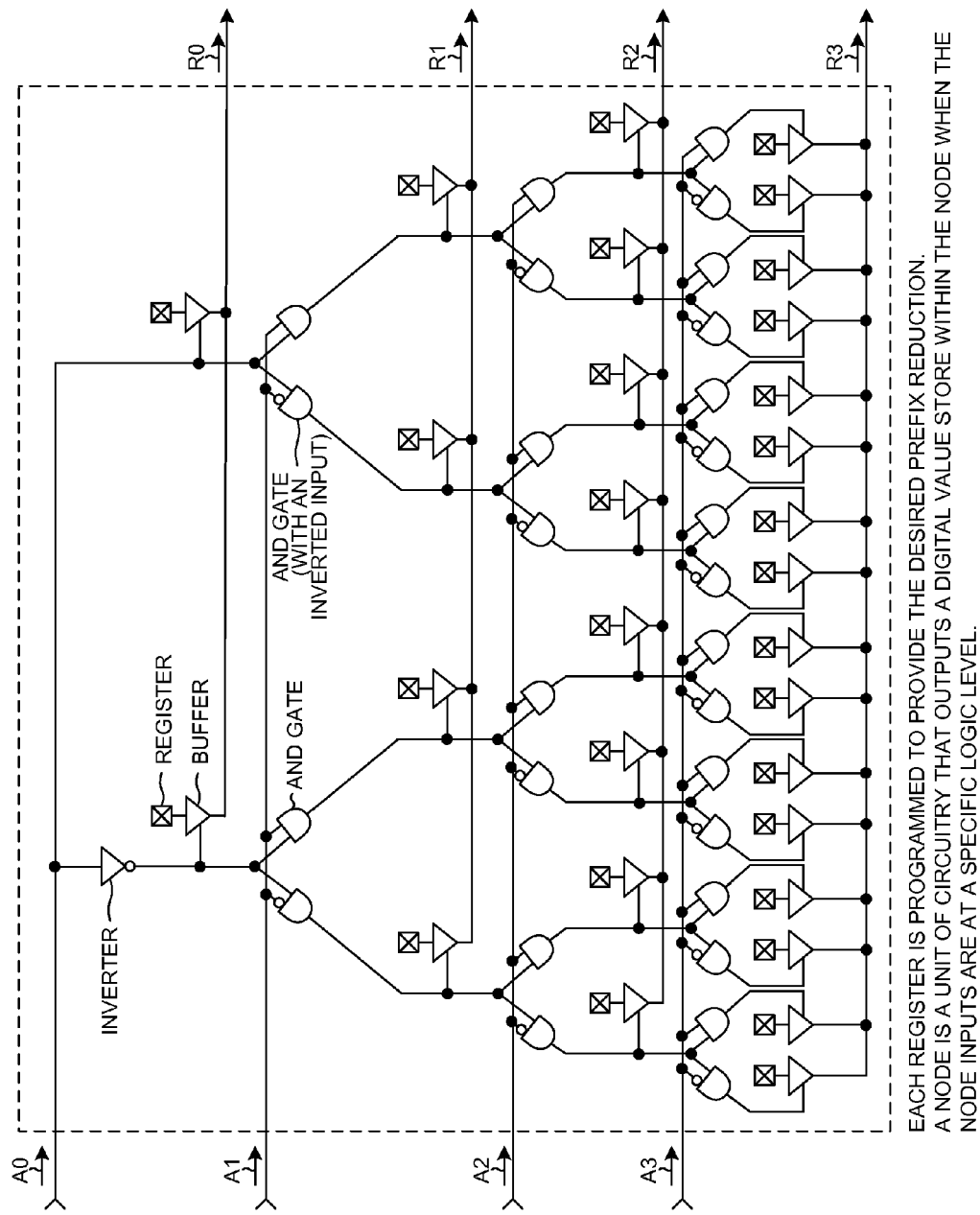
FIG. 26 is a diagram of a hardware prefix reduction circuit.
Figure 27:
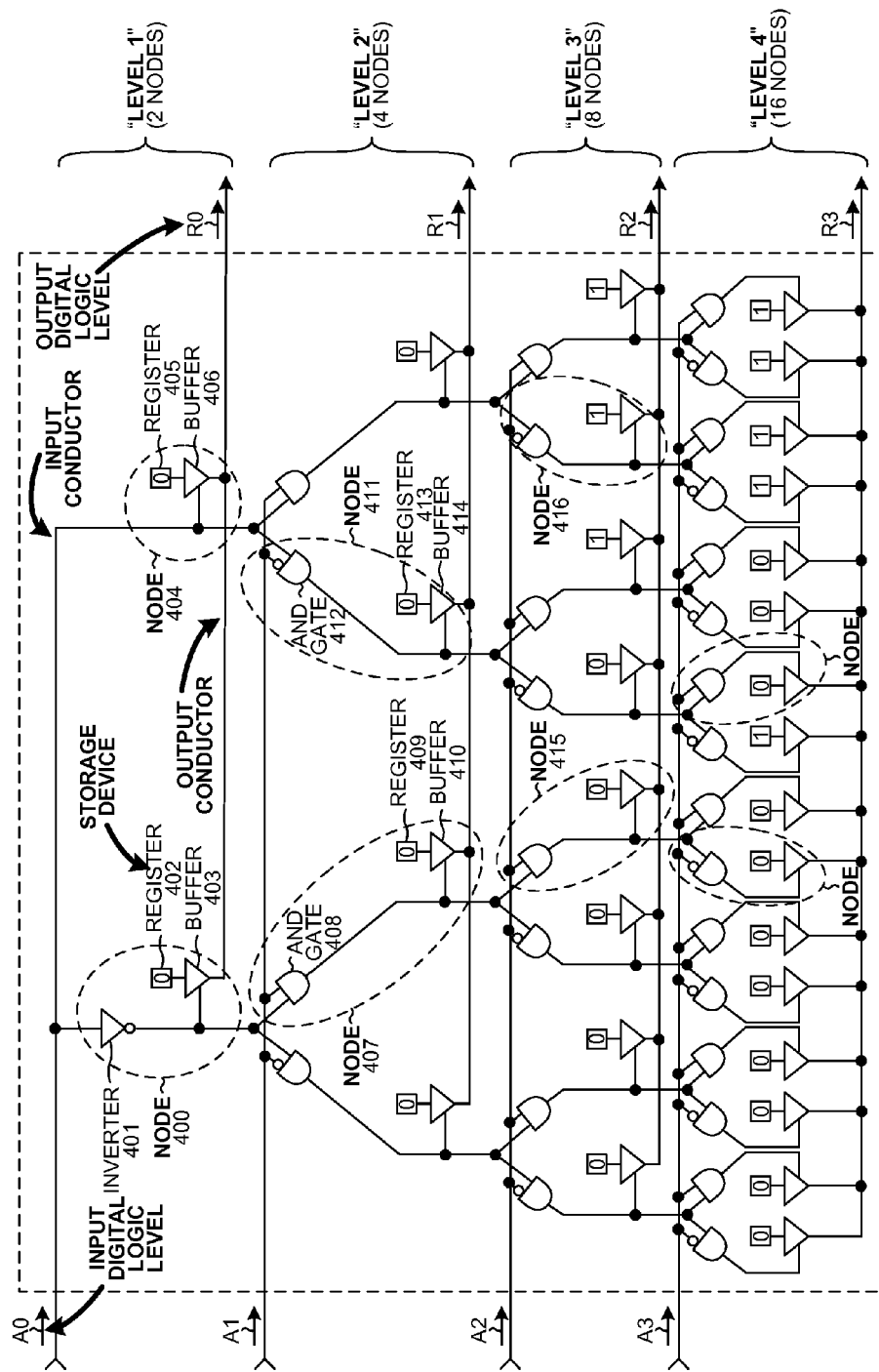
FIG. 27 is an annotated diagram of a hardware prefix reduction circuit.

Hardware Prefix Reduction Circuit: FIG. 26 is a circuit diagram of a hardware prefix reduction circuit. FIG. 27 is an annotated diagram of the hardware prefix reduction circuit of FIG. 26. The hardware reduction circuit includes four levels.

The first level ("level 1") includes two nodes. The second level ("level 2") includes four nodes. The third level ("level 3") includes eight nodes. The fourth level ("level 4") includes sixteen nodes. Each level has an input conductor on which an input digital logic level signal is conducted. Each level has an output conductor on which an output digital logic level signal is conducted.

In the first level ("level 1"), each node has a single input and two outputs. The input of each node is coupled to the input conductor of the first level. The first output of each node is coupled to the output conductor of the first level. The second output of each node is coupled to the second level ("level 2").

The first node 400 of the first level includes an inverter 401, a storage device (register 402) and a buffer 403. An input terminal of inverter 401 is coupled to the input conductor of the first level. An output terminal of inverter 401 is coupled to an enable terminal of the buffer 403. The storage device 402 is coupled to an input terminal of buffer 403. An output terminal of buffer 403 is coupled to the output conductor of the first level.

The second node 404 of the second level includes a storage device (register 405) and a buffer 406. An enable terminal of buffer 406 is coupled to the input conductor of the first level. The storage device 405 is coupled to an input terminal of buffer 406. An output terminal of buffer 406 is coupled to the output conductor of the first level.

In the second level ("level 2"), each node has two inputs and two outputs. The first input terminal of each node is coupled to the input conductor of the second level. The second input terminal of each node is coupled to an output of a node included in the first level. The first output of each node is coupled the output conductor of the second level. The second output of each node is coupled to a node included in the third level ("level 3"). The second level includes two types of nodes: a non-inverting node 407 and an inverting node 411.

Non-inverting node 407, includes an AND gate 408, a storage device (register 209), and a buffer 410. AND gate 408 has two non-inverting input terminals. The first input terminal is coupled to the input conductor of the second level. The second input terminal is coupled to the second output of node 400 included in the first level. An output terminal of the AND gate is coupled to an enable terminal of buffer 410. The storage device 409 is coupled to an input terminal of buffer 410. An output terminal of buffer 410 is coupled to the output conductor of the second level.

Inverting node 411, includes an AND gate 412, a storage device (register 405), and a buffer 414. AND gate 412 has a first inverting input terminal and a second non-inverting input terminal. The first inverting input terminal is coupled to the input conductor of the second level. The second non-inverting input terminal is coupled to the second output of node 404 included in the first level. An output terminal of AND gate 412 is coupled to an enable terminal of buffer 414. A storage device 413 is coupled to an input terminal of buffer 414. An output terminal of buffer 414 is coupled to the output conductor of the second level.

In the third level ("level 3"), each node has two inputs and two outputs. The first input terminal of each node is coupled to the input conductor of the third level. The second input terminal of each node is coupled to an output of a node included in the third level. The first output of each node is coupled the output conductor of the third level. The second output of each node is coupled to a node included in the fourth level ("level 4"). The third level includes two types of nodes: a non-inverting node 415 and an inverting node 416. The non-inverting nodes in the third level are the same as the non-inverting nodes included in the second level. The inverting nodes of the third level are the same as the inverting nodes included in the second level.

In the fourth level ("level 4"), each node has two inputs and one output. The first input terminal of each node is coupled to the input conductor of the fourth level. The second input terminal of each node is coupled to an output of a node included in the third level. The output of each node is coupled the output conductor of the fourth level. The fourth level includes two types of nodes: a non-inverting node and an inverting node. The non-inverting nodes in the fourth level are the same as the non-inverting nodes included in the second level. The inverting nodes of the fourth level are the same as the inverting nodes included in the second level.

While FIGS. 26 and 27 illustrate a four level hardware prefix reduction circuit, the hardware prefix reduction circuit can be expanded to n levels. For example, a six layer hardware prefix reduction circuit would have a first four levels identical to the four layers shown in FIG. 27, with the addition of a fifth level including thirty two nodes and a sixth level including sixty four nodes. The fifth level includes two types of nodes: a non-inverting node and an inverting node. The non-inverting nodes in the fourth level are the same as the non-inverting nodes included in the second level. The inverting nodes of the fourth level are the same as the inverting nodes included in the second level. The sixth level includes two types of nodes: a non-inverting node and an inverting node. The non-inverting nodes in the fourth level are the same as the non-inverting nodes included in the second level. The inverting nodes of the fourth level are the same as the inverting nodes included in the second level. The greater the number of levels included in the hardware prefix reduction circuit, the greater the bit width of the prefix data that can be reduced.

Each storage device in FIG. 27 is independently programmed to provide the desired prefix reduction. A prefix reduction algorithm is shown in FIG. 28. The algorithm returns a value of "0000" whenever the digital logic level on A0 is a "0". The algorithm returns a value of "0001" whenever the digital logic level is "1" on A0, "0" on A1, and "0" on A2. The algorithm returns a value of "0010" whenever the digital logic level is "1" on A0, "0" on A1, and "1" on A2. The algorithm returns a value of "0011" whenever the digital logic level is "1" on A0 and "1" on A1. FIG. 27 lists the digital logic levels to be programmed into each storage device to implement this prefix reduction algorithm.

The prefix reduction algorithm shown in FIG. 28 operates to reduce four bits of prefix data into a two bit representation of four prefix states. The four to two reduction provides fifty percent reduction in memory usage to store the prefix data. The prefix reduction memory savings is illustrated in FIG. 29. The memory size required to store prefix data is $2^n*n$, whereas the memory size required to store the prefix reduction data is $(2^n-1)*2$. The ratio of the memory size required to store the prefix data and to store the prefix reduction data approaches 2/n as n increases, where n is the bit width of the prefix data. In systems where minimization of memory usage, such as in high speed networking devices, a memory savings of 2/n is tremendously advantageous.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) receiving a lookup command onto a transactional memory, wherein the lookup command includes a source identification value, data, a table set value, and a table number value, wherein the transactional memory includes a selectable bank of hardware lookup engines and a memory unit, and wherein the memory unit stores a plurality of result values (RVs);
   (b) determining a base value and a size value based on the table set value and the table number value;
   (c) determining a memory address value based on the base value, the size value, and an index value;
   (d) using the memory address value to read a first word out of the memory unit, wherein the first word includes a plurality of lookup data operands; and
   (e) using the source identification value, the data, an algorithm number value, and the plurality of lookup operands to select one of the plurality of result values (RVs), wherein (e) is performed by one hardware lookup engine selected from the bank of hardware lookup engines.

2. The method of claim 1, wherein the selectable bank of hardware lookup engines are taken from the group consisting of: a direct hardware lookup, a multi-bit trie hardware lookup, a Content Addressable Memory (CAM) hardware lookup, a Content Addressable Memory with Result (CAMR) hardware lookup, a Ternary Content Addressable Memory (TCAM) hardware lookup, a Ternary Content Addressable Memory with Result (TCAMR) hardware lookup, and a hardware prefix reduction circuit.

3. The method of claim 1, wherein the determining of (b) is performed by a table configuration memory, wherein the table configuration memory also generates the algorithm number value based on the table number value and table set value.

4. The method of claim 1, wherein the selected hardware lookup engine is selected based on the algorithm number value.

5. The method of claim 1, wherein the determining of (c) is performed by an address table included in the transactional memory, and wherein the using of (d) is performed by the memory unit.

6. The method of claim 1, wherein the data includes an index value, and wherein the selected result value indicates a port address.

7. The method of claim 1, further comprising:
(f) using the memory address to read a second word out of the memory unit, wherein the second word includes one of a plurality of instructions stored in the memory unit, wherein the lookup command also includes a instruction fetch value, and wherein (f) is only performed when the instruction fetch bit is asserted.

8. The method of claim 1, wherein step (e) further comprises:

(e1) modifying the source identification value, data, or algorithm number information before performing (e), wherein the modification of (e1) is performed by a hardware algorithm prework engine included in the transactional memory.

9. The method of claim 8, wherein the hardware algorithm prework engine is selected based on the algorithm number value.

10. The method of claim 8, wherein the hardware algorithm prework engine is taken from the group consisting of: a decoder circuit, an encoder circuit, a multiplexer circuit, and a barrel shifter circuit.

11. The method of claim 1, wherein (b), (c), and (e) are performed by purely combinatorial logic.

12. The method of claim 1, wherein the lookup command is received onto the transaction memory via a bus, the method further comprising:
(f) outputting the selected one of the plurality of RVs onto the bus.

13. The method of claim 7, wherein the lookup command is received onto the transactional memory via a bus, the method further comprising:
(g) outputting the selected instruction onto the bus.

* * * * *